United States Patent
George et al.

(10) Patent No.: US 12,217,170 B2
(45) Date of Patent: Feb. 4, 2025

(54) DATA HANDLING AND MACHINE LEARNING

(71) Applicant: Battelle Memorial Institute, Columbus, OH (US)

(72) Inventors: Anthony George, Columbus, OH (US); Nicholas Darby, Columbus, OH (US); Jeremy Bellay, Columbus, OH (US); David Collins, Galloway, OH (US); Katie Liszewski, Powell, OH (US); Amir Rahimi, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 983 days.

(21) Appl. No.: 17/216,057

(22) Filed: Mar. 29, 2021

(65) Prior Publication Data

US 2021/0304002 A1 Sep. 30, 2021

Related U.S. Application Data

(60) Provisional application No. 63/000,962, filed on Mar. 27, 2020.

(51) Int. Cl.
*G01R 31/28* (2006.01)
*G06N 3/04* (2023.01)
*G06N 3/08* (2023.01)
*G06N 3/088* (2023.01)

(52) U.S. Cl.
CPC .................. *G06N 3/08* (2013.01); *G06N 3/04* (2013.01)

(58) Field of Classification Search
CPC ............ G06N 3/08; G06N 3/04; G06N 3/045; G06N 3/047; G06N 3/088; G06F 21/562; G06F 21/71; G01N 2021/8845; G01N 2021/8883; G01N 2021/95638;
(Continued)

(56) References Cited

U.S. PATENT DOCUMENTS

| 5,775,806 A | * | 7/1998 | Allred | G01R 31/309 |
| | | | | 250/342 |
| 8,106,946 B2 | * | 1/2012 | Yan | H04N 17/002 |
| | | | | 348/129 |
| 11,906,578 B2 | * | 2/2024 | Kent | G06Q 10/10 |

(Continued)

FOREIGN PATENT DOCUMENTS

WO 2021055446 A1 3/2021

OTHER PUBLICATIONS

Ustun et al., Learning Optimized Risk Score, Journal of Machine Learning Research, Jun. 2019, pp. 1-75 (Year: 2019).*
(Continued)

*Primary Examiner* — Nghia M Doan
(74) *Attorney, Agent, or Firm* — Volpe Koenig

(57) ABSTRACT

A method implemented by a software for a multimodal evaluation engine stored on a memory is provided herein. The software is executable by a processor coupled to the memory to cause the method. The method includes receiving multimodal signatures of an object of interest from inspection elements and processing the multimodal signatures to transform the multimodal signatures into formats. The method also includes generating data representations of the formats and detecting whether anomalies are present within the object of interest based on the data representations.

17 Claims, 13 Drawing Sheets

(58) Field of Classification Search
CPC .......... G01N 2201/1296; G01R 31/281; G01R 31/2837; G01R 31/2846
See application file for complete search history.

(56) References Cited

U.S. PATENT DOCUMENTS

2004/0004482 A1 1/2004 Bouabdo et al.
2004/0010444 A1* 1/2004 Delorme .............. G01R 31/281
702/183

OTHER PUBLICATIONS

Azhagan Mukhil M.S et al: "A Review on Automatic Bill of Material Generation and Visual Inspection on PCBs", ISTFA 2019: Conference Proceedings From the 45TH International Symposium for Testing and Failure Analysis, ISTFA. 2019, vol. 1025086191213580557101113141516171 8, Dec. 1, 2019 (Dec. 1, 2019), pp. 256-265, XP055819604, figure 4; table 1, p. 263, col. 1.

Kangqiao Hu et al: "High-sensitivity hardware trojan detection using multimodal characterization", Design, Automation and Test in Europe, Eda Consortium, 111 West Saint John Street, Suite 220 San Jose CA 95113 USA, Mar. 18, 2013 (Mar. 18, 2013), pp. 1271-1276, XP058019046, DOI: 10.7873/DATE.2013.263 ISBN: 978-1-4503-2153-2 figure 1.

Koirala A et al: "Deep learning for real-time fruit detection and orchard fruit load estimation: benchmarking of I." Precision Agriculture, Springer US, Boston, vol. 20, No. 6, Feb. 28, 2019 (Feb. 28, 2019), pp. 1107-1135, XP036910070, ISSN: 1385-2256, DOI: 10.1007/S11119-019-09642-0 [retrieved on Feb. 28, 2019] the whole document.

Xin Yi et al: "Generative Adversarial Network in Medical Imaging: A Review", arxiv.org, Cornell University Library, 201 Olin Library Cornell University Ithaca, NY 14853, Sep. 19, 2018 (Sep. 19, 2018), XP081491720, DOI: 10.1016/J.MEDIA.2019.101552 the whole document.

International Search Report and Written Opinion for International Application No. PCT/US2021/024666 dated Jul. 9, 2021.

* cited by examiner

DATA HANDLING AND MACHINE LEARNING

CROSS REFERENCE TO RELATED APPLICATIONS

This application claims the benefit of U.S. Provisional Patent Application No. 63/000,962 filed Mar. 27, 2020 entitled DATA HANDLING AND MACHINE LEARNING, which application is incorporated by reference as if fully set forth.

FIELD OF INVENTION

The invention relates to hardware assurance, and in particular to multimodal signatures analysis for hardware devices for hardware assurance.

BACKGROUND

Hardware trojans are hardware devices intentionally and/or maliciously added to or replaced on a device (e.g. "implanted"), such as a printed circuit board (PCB). Hardware trojans may be hidden or "cloaked" to avoid detection through common testing regimes. Claims of such malicious device modification have brought attention to the need for reliable and automated board-level verification and validation techniques.

Current approaches to verification and validation rely on manual inspection of devices by skilled engineers to attempt to ascertain features that may be risky or otherwise anomalous. For example, these skilled engineers perform a manual destructive approach that disassembles a PCB layer by layer, rendering the device useless. Yet, schematics and other design information may not be available for such verification and validation, or other purposes, for devices that are purchased "off the shelf".

There is a need for efficient and non-evasive hardware assurance.

SUMMARY

According to one or more embodiments, a method is provided. The method can be implemented by a software for a multimodal evaluation engine stored on a memory. The software is executable by one or more processors coupled to the memory. The method includes receiving a plurality of multimodal signatures of an object of interest from one or more inspection elements and processing the plurality of multimodal signatures to transform the plurality of multimodal signatures into one or more formats. The method also includes generating data representations of one or more formats and detecting whether one or more anomalies are present within the object of interest based on the data representations.

According to one or more embodiments, the method embodiment above can be implemented as an apparatus, a device, a system, and/or a computer program product.

BRIEF DESCRIPTION OF THE DRAWING(S)

DETAILED DESCRIPTION OF THE PREFERRED EMBODIMENT(S)

Figure 1:
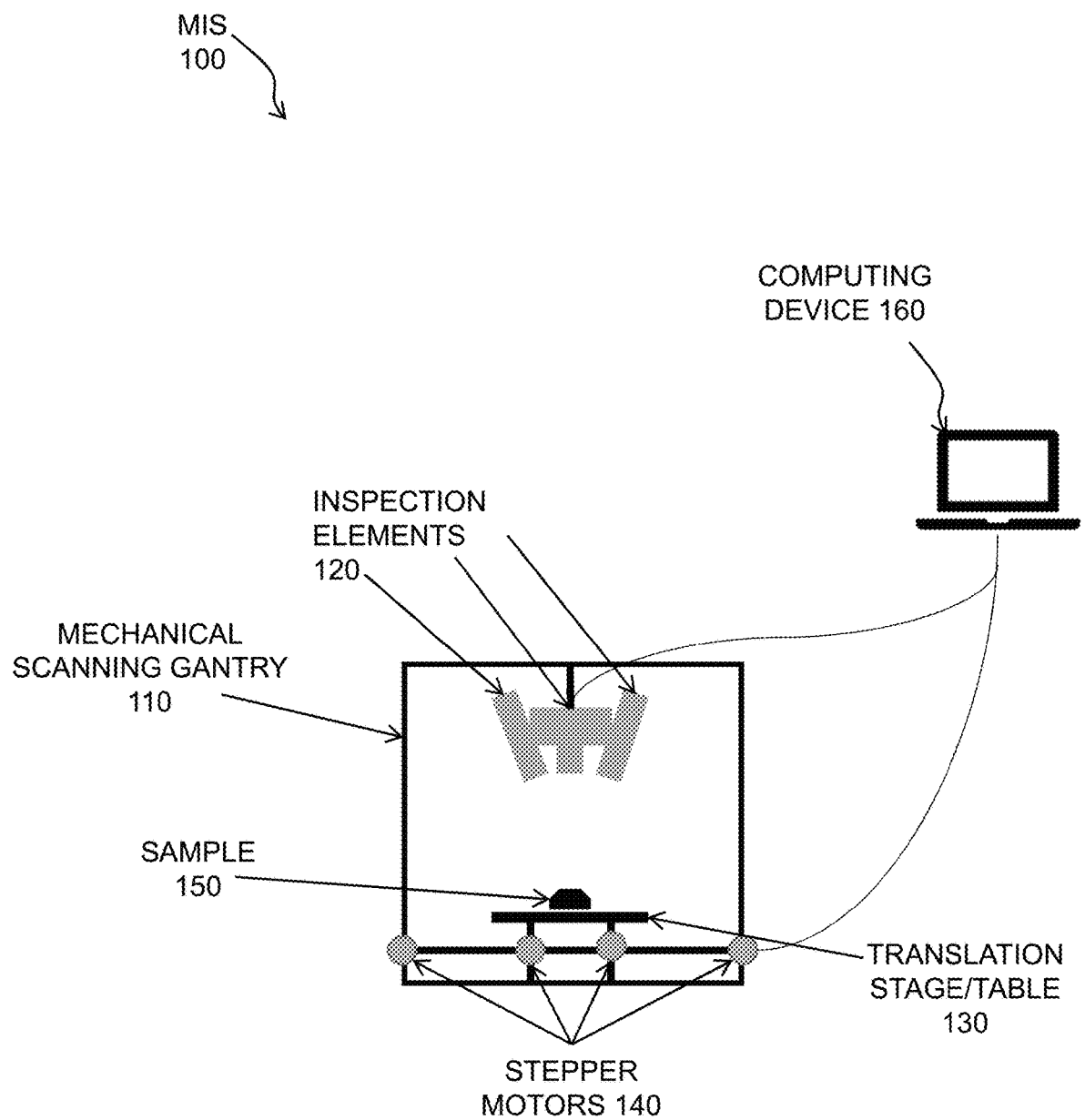
FIG. 1 illustrates an example multimodal inspection system (MIS) from a front-side-view perspective according to one or more embodiments.

Disclosed herein is a machine learning and/or an artificial intelligence method and system for hardware assurance (e.g., by a multimodal signatures analysis for hardware devices for such hardware assurances). More particularly, the present invention relates to a machine learning/artificial intelligence (ML/AI) algorithm that provides the hardware assurance through executing an analysis of multimodal signatures of hardware devices via neural networks (NNs) or artificial neural networks (ANNs). The ML/AI algorithm is a processor executable code or software that is necessarily rooted in process operations by, and in processing hardware of, multimodal inspection system (MIS).

According to one or more embodiments, the ML/AI algorithm includes a multimodal evaluation engine that executes and processes hyperspectral-multimodal scans of printed circuit boards (PCBs) or the like (e.g., hardware devices) to generate data representations that otherwise would not be available.

In this regard, the multimodal evaluation engine produces, aggregates, and/or converts (e.g., executes) the hyperspectral-multimodal scans into training data to build an assessment model, which the multimodal evaluation engine can improve automatically through experience. Note that the hyperspectral-multimodal scans go beyond conventional inspection methods because the hyperspectral-multimodal scans include complex images, such as infrared (IR), electromagnetic interference (EMI), and Terahertz (THZ) scans, such that the training data incorporates these complex images alongside visible light images and x-ray images. Note also that the assessment model goes beyond conventional inspection methods because ANNs of the assessment model process this training data to determine particular predictors from the hyperspectral-multimodal scans.

Further, the multimodal evaluation engine emulates cognitive abilities to perceive and capture processing signatures of an object being evaluated (e.g., the printed circuit boards or the like) from real-time hyperspectral-multimodal scans of the object by applying the assessment model to the real-time hyperspectral-multimodal scans and outputting the data representations thereof. One or more advantages, technical effects, and/or benefits of the multimodal evaluation engine include improving multimodal inspection system by enabling true assessments of hardware devices via the data representations without performing a manual destructive approach (e.g., disassembling a PCB layer by layer). The data representations, for example, are a useful transformation of raw data (e.g., the real-time hyperspectral-multimodal scans) because the data representations provide structured representations, material assessments, connections maps, vulnerability information, design predictions, etc. that are otherwise not currently available or produced by conventional inspection methods. The multimodal evaluation engine can further provide feedback to the assessment model to improve automatically through experience in accordance with the data representations.

FIG. 1 illustrates an example multimodal inspection system (MIS) 100. The MIS 100, in general, can include devices, methods, and/or systems for verification and validation of board-level electronic devices that enable automated nondestructive inspection for hardware assurance. The MIS 100 includes a mechanical scanning gantry 110, one or more inspection elements 120, a translation stage/table 130, stepper motors 140, a sample 150, and a computing device 150.

The MIS 100 is shown in FIG. 1 from a front-side-view perspective according to one or more embodiments. The MIS 100 can provide/generate multimodal spatially-correlated signatures (MMS). For example, verification and/or validation of PCB or other device is performed based on one or more generated MMSs. The MIS 100 can store MMSs as digital representations of an object of interest (e.g., the PCB or other device), in multiple measurement domains, as MMS data.

The MIS 100 may be implemented with the mechanical scanning gantry 110 that provides a structure and a frame for other components, such as the one or more inspection elements 120 for multiple modalities fixed above the translation stage/table 130. The inspection elements 120 may be pointed towards the translation stage/table 130. At least one inspection elements 120 can be a sensor (e.g., camera) that is aimed normal to the translation stage/table 130, while others inspection elements 120 may be aimed at an angle. The inspection elements 120 inspect the object of interest (e.g., the sample 150) across the multiple measurement domains. The measurement domains may include, for example, visible light (VIS), longwave infrared (LWIR), shortwave infrared (SWIR), backscatter x-ray, and/or laser profilometry (LP), as well as electromagnetic interference (EMI) and Terahertz (THZ) scans. As an example, TABLE 1 lists modality sensor details for the MIS 100, including example instruments and example critical specifications for each example modality.

TABLE 1

| Example Modality | Example Instrument | Example Spectral Range (μm) | Example Lateral Resolution (μm) |
|---|---|---|---|
| VIS | FLIR Blackfly S | 0.4-0.8 | 6.5 |
| LWIR | FLIR T530 | 7.5-14.0 | 70.6 |
| SWIR | Princeton Instruments NIRvana 640 | 0.9-1.7 | 11.6 |

TABLE 1-continued

| Example Modality | Example Instrument | Example Spectral Range (μm) | Example Lateral Resolution (μm) |
|---|---|---|---|
| LP | Micro Epsilon ScanCONTROL 2950 | — | 23.1 |

According to one or more embodiments, digital signatures are generated for a variety of devices, such as commercial-off-the-shelf (COTS) devices. The MIS 100 can provide post-processing and/or ML/AI techniques to the MMS data to generate spatially-correlated risk and/or anomaly metrics for the entire object of interest (e.g., the sample 150). For example, the VIS, LWIR, and SWIR data may be represented digitally as 24-bit, 16-bit and 8-bit values, respectively, at discrete xy locations with physical spacing at the corresponding example lateral resolutions listed in TABLE 1. For instance, the LP data is saved as a list of 64-bit floating point xyz coordinate values as output by the LP sensor (e.g., the inspection elements 120) and motor controller (e.g., the stepper motors 140), and converted to an orthographic image using two-dimensional binning at the lateral resolution limit to enable spatially-correlated comparison between similar samples.

According to one or more embodiments, the post-processing and/or ML/AI techniques of the MIS 100 can provide automatic standardization and/or window-filtering. Standardization by the MIS 100 can include scaling, offsetting, or brightening data to facilitate cross-sample comparisons, e.g., adjusting laser profilometer Z measurements to have the device (e.g., the sample 150) surface at zero, to minimize complications from variation in structure height on the backside of the board. Window filtering by the MIS 100 can include a class of de-noising algorithms that drag a "window" (e.g., range of data) across matrix data and either remove noise or emphasize features of interest. For example, such filtering may set each pixel intensity to the median value of its eight nearest neighbors (i.e., a window of nine pixels), or may use an edge detection filter to emphasize borders between different materials. The filtered data may be ingested by an appropriate data analysis pipeline, depending on the application.

The stepper motors 140 may be attached to the mechanical scanning gantry 110, and the translation stage/table 130 may be attached to the mechanical scanning gantry 110 via the stepper motors 140. The stepper motors 140 may enable x, y, and/or z translation of the translation stage/table 130 allowing control of the position of the sample 150 with a high degree of accuracy (e.g., 12.5 μm or better). The stepper motors 140 may have both coarse and fine motor control.

According to one or more embodiments, the relative x, y, and/or z offsets of each sensor can be recorded such that multimodal data can be spatially-correlated without the need to capture data simultaneously and/or at multiple angles. Further, the sample 150 can be aligned rectilinearly with the translation stage/table 130 and the inspection elements 120, and an origin of the sample 140 is placed in the center of the VIS field of view (FOV), e.g., using coarse and fine motor control adjustment functions; after which, the dimensions of the sample space are defined, data acquisition initiated, and the modalities are captured.

According to one or more embodiments, all modalities are captured sequentially. For instance, the entire sample may not be able to be captured simultaneously, such as do to limitations of the inspection elements 120 (e.g., sensor array size limitations). Accordingly, image stitching and/or data registration may be employed to create a complete modal signature by fusing subsets of data with a known overlap in physical space. Likewise, environmental factors such as illumination, ambient temperature and relative humidity, and/or sensor calibration settings such as optical focus and exposure time may be controlled to assure high repeatability in measurements for all modalities.

The sample 150 may be removably attached to the translation stage/table 130 allowing the sample 150 to remain stationary as the translation stage/table 130 is moved. This configuration may enable the inspection elements 120 to remain stationary as the translation stage/table 130, and fixed the sample 150 (e.g., a PCB), moves freely in one or more axes. In an example, the translation stage/table 130 may be configured to laterally translate the sample 150 relative to the plane of the sample 150, such as the plane of a PCB. Note that one or more sides (e.g., the front and back) of the sample 150 can be considered or scanned to provide optimum performance when utilizing these scans.

The inspection elements 120 and the stepper motors 140 may be operatively connected to the computing device 160. The computing device 160 may be hard wired or connected wirelessly, and may be local or remote to the mechanical scanning gantry 110 and attached components. There may be one or more power supplies that may provide power to the inspection elements 120, the stepper motors 140, the computing device 160, and/or the sample 150 (e.g., for testing purposes, such as for testing with sample 150 powered).

As a practical application example, in the field of trusted microelectronics, the MIS 100 can expand beyond chip-level assurance to include the boards and assemblies on which the chips are hosted. The MIS 100 can inspect an authenticity of integrated circuits (IC) through side-channel analysis correlation to known authentic parts. In turn, the MIS 100 provides reliable and automated board-level verification and validation techniques to counteract malicious PCB modifications. According to one or more embodiments, the MIS 100 can extract surface, subsurface and/or functional characteristics from an object of interest (e.g., the sample 150) using nondestructive techniques, spatially correlate this multimodal data in real space, and generate risk and/or anomaly profiles for the entire surface of the object of interest. According to one or more embodiments, the MIS 100 can include at least three integrated parts (e.g., the mechanical scanning gantry 110, post-processing software of the computing device 160 for signal generation, and a database of reference data for risk assessment (e.g., the databased being part of or in communication with the computing device 160). Accordingly, the MIS 100 includes one or more technical effects, advantages, and benefits, such as minimizing user interaction with the system, while accommodating user-defined scanning parameters, to improve and/or optimize throughput for lossless information of interest.

Figure 2:
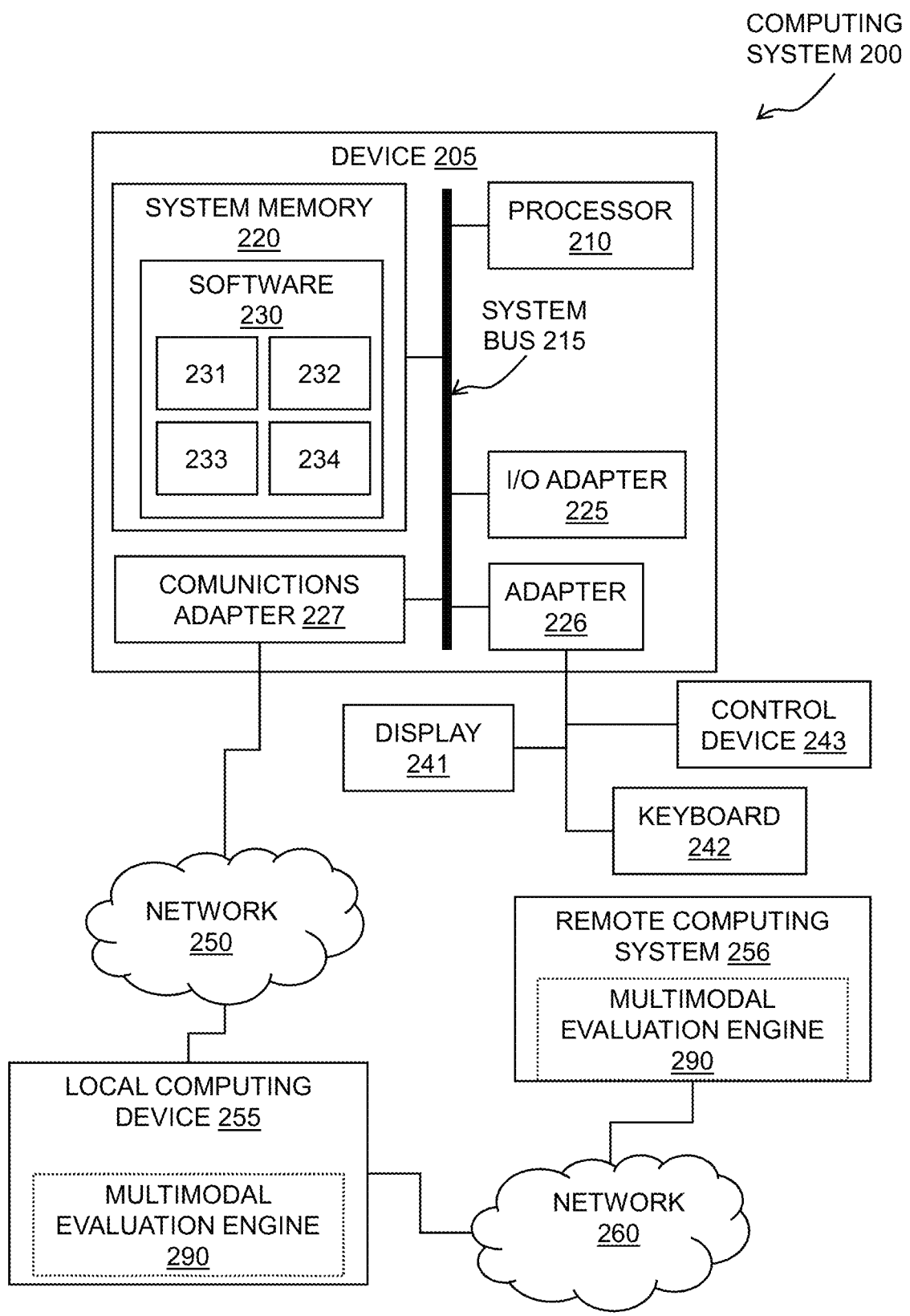
FIG. 2 illustrates a computing system according to one or more embodiments according to one or more embodiments.

Turning now to FIG. 2, a computing system 200 is illustrated according to one or more embodiments. The computing system 200 can be representative of any computing device, computing apparatus, and/or computing environment, which comprise hardware, software, or a combination thereof. Further, embodiments of the computing system 200 disclosed may include apparatuses, systems, methods, and/or computer program products at any possible technical detail level of integration.

The computing system 200 has a device 205 (e.g., the computing device 160 of FIG. 1) with one or more central processing units (CPU(s)), which are collectively or generically referred to as a processor 210. The processor 210, also referred to as processing circuits, is coupled via a system bus 215 to a system memory 220 and various other components. The computing system 200 and/or the device 205 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

The processor 210 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. The processor 210 may also have multiple processing cores, and at least some of the cores may be configured to perform specific functions. Multi-parallel processing may also be configured. In addition, at least the processor 210 may be a neuromorphic circuit that includes processing elements that mimic biological neurons.

The bus 215 (or other communication mechanism) is configured for communicating information or data to the processor 210, the system memory 220, and various other components, such as the adapters 225, 226, and 227.

The system memory 220 is an example of a (non-transitory) computer readable storage medium, where software 230 can be stored as software components, modules, engines, instructions, or the like for execution by the processor 210 to cause the device 205 to operate, such as described herein with reference to FIGS. 5-13. The system memory 220 can include any combination of a read only memory (ROM), a random access memory (RAM), internal or external Flash memory, embedded static-RAM (SRAM), solid-state memory, cache, static storage such as a magnetic or optical disk, or any other types of volatile or non-volatile memory. Non-transitory computer readable storage mediums may be any media that can be accessed by the processor 210 and may include volatile media, non-volatile media, or the like. For example, the ROM is coupled to the system bus 215 and may include a basic input/output system (BIOS), which controls certain basic functions of the device 205, and the RAM is read-write memory coupled to the system bus 215 for use by the processors 210. Non-transitory computer readable storage mediums can include any media that is removable, non-removable, or the like. The system memory 220 can also store all raw data (e.g., MMS data), including a margin around the sample object of interest (e.g., the sample 150 of FIG. 1).

In connection with FIG. 1, the software 230 of FIG. 2 can be representative of the computing device 160 and components therein, such that the memory 220 and the processor 210 can logically operate/configure/control the MIS 100. The software 230 of FIG. 2 can also be representative of an OS for the device 205 for the computing system 200 and/or any other application.

According to one or more embodiments, the software 230 can be configured in hardware, software, or a hybrid implementation. The software 230 can be composed of modules that are in operative communication with one another, and to pass information or instructions. The software 230 can further include custom modules to perform application/inspection/evaluation specific processes or derivatives thereof, such that the computing system 200 may include additional functionality. For example, according to one or more embodiments, the software 230 may be configured to store information, instructions, commands, or data to be executed or processed by the processor 210 to enable operations 231, 232, 233, and 234.

For instance, the computing device 160 of FIG. 1 implemented as the software 230 of FIG. 2 to provide a specific configuring and evaluation method (and algorithms for processing signatures captured by the MIS 100 therein) to the computing system 200, so that the computing system 200 can receive (231) raw multimodal scans, determine (232) useful formats (e.g., process and transform the raw multimodal scans), and link (233) data representations. Note that specific configuring and evaluation method can generate (234) one or more data blocks that include hyperspectral-multimodal scans of PCB, assessments of a bill of materials, determinations of how components are connected, and vulnerability information. Further, the one or more data blocks can be used for downstream tasks, along with design prediction.

Further, modules of the software 230 can be implemented as a hardware circuit comprising custom very large scale integration (VLSI) circuits or gate arrays, off-the-shelf semiconductors such as logic chips, transistors, or other discrete components, in programmable hardware devices (e.g., field programmable gate arrays, programmable array logic, programmable logic devices), graphics processing units, or the like. Modules of the software 230 can be at least partially implemented in software for execution by various types of processors. According to one or more embodiments, an identified unit of executable code may include one or more physical or logical blocks of computer instructions that may, for instance, be organized as an object, procedure, routine, subroutine, or function. Executables of an identified module co-located or stored in different locations such that, when joined logically together, comprise the module. A module of executable code may be a single instruction, one or more data structures, one or more data sets, a plurality of instructions, or the like distributed over several different code segments, among different programs, across several memory devices, or the like. Operational or functional data may be identified and illustrated herein within modules of the software 230, and may be embodied in a form and organized within any type of data structure.

With respect to the adapters 225, 226, and 227 of FIG. 2, the device 205 can particularly include an input/output (I/O) adapter 225, a device adapter 226, and a communications adapter 227. According to one or more embodiments, the I/O adapter 225 can be configured as a small computer system interface (SCSI), of in view of frequency division multiple access (FDMA) single carrier FDMA (SC-FDMA), time division multiple access (TDMA), code division multiple access (CDMA), orthogonal frequency-division multiplexing (OFDM), orthogonal frequency-division multiple access (OFDMA), global system for mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication. The device adapter 226 interconnects input/output devices to the system bus 215, such as a display 241, a keyboard 242, a control device 243, or the like (e.g., a camera, a speaker, etc.). The communications adapter 226 interconnects the system bus 215 with a network 250, which may be an outside network, enabling the device 205 to communicate data with other such devices (e.g., such as the local computing device 255 and, further, the remote computing system 256 through the network 260). In one embodiment, the adapters 225, 226, and 227 may be connected to one or more I/O buses that are connected to the system bus 215 via an intermediate bus bridge. I/O buses for connecting peripheral devices such as hard disk controllers, network adapters, and graphics adapters typically include common protocols, such as the Peripheral Component Interconnect (PCI).

Examples of the display 241 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina display, an in-plane switching (IPS) display or the like. The display 241 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

The keyboard 242 and the control device 243, such as a computer mouse, a touchpad, a touch screen, a keypad, or the like, may be further coupled to the system bus 215 for input to the device 205. In addition, one or more inputs may be provided to the computing system 200 remotely via another computing system (e.g., the local computing device 255 and/or the remote computing system 256) in communication therewith, or the device 205 may operate autonomously.

According to one or more embodiments, the functionality of the device 205 with respect to the software 230 can also be implemented on the local computing device 255 and/or the remote computing system 256, as represented by separate instances of the multimodal evaluation engine 290.

According to one or more embodiments, the functionality of the software 230 and the multimodal evaluation engine 290 can implement ML/AI algorithm therein. The machine learning and/or the artificial intelligence algorithms operate with respect to hardware, using data (e.g., user actions), to train a machine, build models, and predict outcomes. According to one or more embodiments, the data can be on-going recorded data, currently collected data, historical data, or other data. The machine operates as a controller associated with the hardware and trains to include an analysis and correlation of the data collected. The model is built on the data by physical hardware and/or software modeling, algorithmic modeling, and/or the like so that the data (or subsets thereof) is represented and processed. In some aspects, building of the model is part of self-training operations by the machine. The model can be configured to model the operation of hardware and/or the data to predict the outcome that may be achieved by the hardware. Thus, for the software 230 and/or the multimodal evaluation engine 290 to operate with respect to the hardware, using the data, to train the machine, build the model, and predict the outcomes, the machine learning and/or the artificial intelligence algorithms therein can include NNs. In general, a NN is a network or circuit of neurons, or in a modern sense, an ANN, composed of artificial neurons or nodes or cells.

For example, an ANN involves a network of processing elements (artificial neurons) which can exhibit complex global behavior, determined by the connections between the processing elements and element parameters. These connections of the network or circuit of neurons are modeled as weights. A positive weight reflects an excitatory connection, while negative values mean inhibitory connections. Inputs are modified by a weight and summed using a linear combination. An activation function may control the amplitude of the output. For example, an acceptable range of output is usually between 0 and 1, or it could be −1 and 1. In most cases, the ANN is an adaptive system that changes its structure based on external or internal information that flows through the network.

In more practical terms, NNs are non-linear statistical data modeling or decision-making tools that can be used to model complex relationships between inputs and outputs or to find patterns in data. Thus, ANNs may be used for predictive modeling and adaptive control applications, while being trained via a dataset. Note that self-learning resulting from experience can occur within ANNs, which can derive conclusions from a complex and seemingly unrelated set of information. The utility of ANN models lies in the fact that they can be used to infer a function from observations and also to use it. Unsupervised NNs can also be used to learn representations of the input that capture the salient characteristics of the input distribution, and more recently, deep learning algorithms, which can implicitly learn the distribution function of the observed data. Learning in NNs is particularly useful in applications where the complexity of the data (e.g., the user actions) or the resulting tasks/steps/sequences/workflows makes the design of such functions by hand impractical.

NNs can be used in different fields. Thus, for the software 230 and/or the multimodal evaluation engine 290, the machine learning and/or the artificial intelligence algorithms therein can include NNs that are divided generally according to tasks to which they are applied. These divisions tend to fall within the following categories: regression analysis (e.g., function approximation) including time series prediction and modeling; classification including pattern and sequence recognition; novelty detection and sequential decision making; data processing including filtering; clustering; blind signal separation, and compression. For example, Application areas of ANNs include nonlinear system identification and control (vehicle control, process control), game-playing and decision making (backgammon, chess, racing), pattern recognition (radar systems, face identification, object recognition), sequence recognition (gesture, speech, handwritten text recognition), medical diagnosis and treatment, financial applications, data mining (or knowledge discovery in databases, "KDD"), visualization and e-mail spam filtering.

According to one or more embodiments, the NN can implement a long short-term memory NN architecture, a convolutional neural network (CNN) architecture, a generative adversarial network (GAN), or other the like. The NN can be configurable with respect to a number of layers, a number of connections (e.g., encoder/decoder connections), a regularization technique (e.g., dropout); and an optimization feature. Some implementations utilize an ANN, such as a convolutional encoder/decoder architecture (e.g., similar to a convolutional encoder/decoder architecture used for design prediction as discussed above) to develop models to predict risk masks from various combinations of modalities. This supervised approach may create visualizations highlighting potentially risky regions of the device under examination.

The long short-term memory NN architecture includes feedback connections and can process single data points (e.g., such as images or screen shots), along with entire sequences of data (e.g., such as typing, speaking, and/or application switching). A unit of the long short-term memory NN architecture can be composed of a cell, an input gate, an output gate, and a forget gate, where the cell remembers values over arbitrary time intervals and the gates regulate a flow of information into and out of the cell.

The CNN architecture is a shared-weight architecture with translation invariance characteristics where each neuron in one layer is connected to all neurons in the next layer. The regularization technique of the CNN architecture can take advantage of the hierarchical pattern in data and assemble more complex patterns using smaller and simpler patterns. If the NN implements the CNN architecture, other configurable aspects of the architecture can include a number of filters at each stage, kernel size, a number of kernels per layer.

According to one or more embodiments, the ML/AI functionality of the software 230 and the multimodal evaluation engine 290 can be trained to analyze images based on known sets of labeled data. For instance, the software 230 provides/receives/generates a labeled dataset for anomaly detection. More particularly, an unlabeled dataset for a classification task can be inputted. A first subset of the unlabeled dataset is labeled. An ANN is trained on the labeled subset. Remaining unlabeled data of the unlabeled dataset is labeled based on the trained ANN. Further, the software 230 can provide spatial risk scoring. Locations of a feature considered to pose a risk are labeled on each MMS of a set of training data. The ANN is trained to predict locations of the feature using the labeled training data. A risk heatmap of an unseen device can be generated based on MMSs of the unseen device using the trained ANN. Furthermore, the software 230 can provide design information extraction. An MMS of each of a plurality of devices can be labeled based on components of the device to generate a plurality of labeled MMSs. Each labeled MMS of the plurality of devices can be broken into training tiles of a fixed physical size. The ANN is trained to identify components on devices based on the training tiles. An MMS of an unseen device can be broken into evaluation tiles of the fixed physical size. For each evaluation tile, whether a component exists on the tile using the trained ANN can be identified.

According to one or more embodiments, the software 230 can provide detecting hardware variants, e.g., using GANs, such as conditional GANs (C-GANs) or conditional BiGANs (C-BiGANs). For example, a GAN (e.g., C-BiGAN in these examples) may be used combine multimodal imaging sources to detect anomalies that may indicate hardware trojans or other anomalies. As indicated herein, hardware trojans refer to hardware devices intentionally and/or maliciously added to or replaced on (e.g. "implanted") a device. For example, a trojan may be designed to avoid detection from visual or X-RAY inspection. Such trojan may however be detectable under other types of inspection, such as under IR, EMI, and/or Terahertz (THZ) inspection.

According to one or more embodiments, the software 230 can provide detecting hardware anomalies. An MMS of each of a plurality of devices is broken into training tiles of a fixed physical size. The ANN is trained to identify hardware anomalies based on the training tiles. An MMS of an unseen device is broken into evaluation tiles of the fixed physical size. For each evaluation tile, probability that the tile corresponds to a hardware anomaly can be evaluated using the trained ANN to output an evaluation score. A heatmap of the unseen device which indicates potential hardware anomalies on the device can be generated based on the evaluation scores of the evaluation tiles. Further, the software 230 can provide select MMS data having modalities (e.g., a number of modalities being equal to a, where a is an integer greater than 0) as training data. Each MMS of the training data can be broken into training tiles of a fixed physical size. A number of C-GANs (e.g., the number being equal to B, where a is an integer greater than 0) can be trained to generate candidate tiles for each of a modalities. An unseen set of MMS can be selected as benchmarking data. Each MMS of the benchmarking data can be broken into benchmarking tiles of the fixed physical size. A candidate representation is generated, by each of the B C-GANs, for each modality of each benchmarking tile, such that each of the set of training tiles can be paired with one of a set of generated candidate tiles. An expected loss distribution can be evaluated for each modality of the candidate tiles. A further unseen set of MMS is selected as anomaly scoring data. Each MMS of the anomaly scoring data is broken into anomaly scoring tiles of the fixed physical size. A candidate representation can be generated, by each of the B C-GANs, for each modality of each anomaly scoring tile, such that each of the set of candidate MMS tiles is paired with one of a set of anomaly scoring tiles. An expected loss distribution can be evaluated for each modality of each tile. The loss scores can be converted from each modality of each tile to p-values based on the modality loss distributions. The probability values of all modalities for each tile can be combined to generate a tile score for each tile. An original spatial positioning of each tile is reconstructed to generate an anomaly heatmap. Tiles in the heatmap are overlapped to increase anomaly resolution beyond an underlying tile size.

According to one or more embodiments, the software 230 can provide self-supervised learning based on anomaly detection. An unlabeled dataset can be input for a classification or detection task. A first subset of the unlabeled dataset can be hand-labeled for the classification or detection task. The ANN is trained for the task. An anomaly detection algorithm is trained based on the subset to generate a preliminary model. Labels are generated for a further subset of the unlabeled data based on the preliminary model. Anomaly scores are generated for each of the labeled further subset based on the anomaly detection algorithm. Data of the labeled additional subset associated with anomaly score above a threshold is dropped or analyze further. The preliminary model is re-trained based on the original hand-labeled data and the labeled further subset.

According to one or more embodiments, the software 230 can provide design information recovery. A set of MMSs of a device can be selected as training data. Positions and types of components of the device can be labeled in the training data. Positions, orientations, and other aspects of text on the device can be labeled in the training data. Each training MMS can be broken into tiles of a fixed physical size. An object detector can be trained to identify components on the device based on models of the components. A text detector can be trained to identify text locations on the device. An optical character recognition (OCR) model can be trained to generate a representation of text at identified text locations on the device. Component markings of the components can be characterized based on overlapping identified text locations and identified component directions. The characterized component markings can be cross-referenced in a database to retrieve a set of associated datasheets. The ANN can be trained to predict rasterized design layers based on tiles which are identified to include component markings. Locations where copper design layers and soldermask design layers co-occur within a threshold distance of a component can be identified as pin locations. An estimated logical connectivity graph or matrix for the device can be generated based on the indicated pin locations and design layers. Values of the estimated logical connectivity graph or matrix can be binarized to generate a netlist describing estimated pin locations and estimated connections between pins. The identified text and component markings and estimated connections can be correlated to generate an extracted design of the device.

According to one or more embodiments, the software 230 can provide spatial risk scoring. A set of MMSs is selected as training data. Locations of a feature considered to pose a risk are labeled on each MMS of the training data to generate a risk map. Each MMS of the training data into training data is broken into tiles of a fixed physical size. An ANN is trained to predict pixels associated with the risky feature based on the training data tiles as input, and the risk map as output. An unseen MMS is selected as evaluation data to be evaluated by the trained ANN. The unseen MMS is broken into evaluation tiles of the fixed physical size. Each evaluation tile is input to the ANN to generate a risk heatmap associated with each evaluation tile. The spatial positioning of the evaluation tiles is reconstructed to generate a risk heatmap for the unseen MMS.

According to one or more embodiments, the software 230 can provide anticipate what components/functions are implied by common design practices and how these implications differ from what is empirically observed (e.g., avoid a reliance on a sample known not to be anomalous, e.g., a "golden board"). Such differences may imply the presence of a hardware trojan or other anomaly. IN this was, the software 230 can go beyond simple correlational analysis and use a GAN framework to improve the connection between latent and observed data. For example, C-BiGANs can be described conceptually as a generator G that maps between a latent feature space Z and a space of empirically observed data X, such that $G(Z) \rightarrow X$ where $X \in X$ and $Z \in Z$. A discriminator D can be trained simultaneously to differentiate between data produced by the generator and observed data. C-BiGANs are of immediate interest for anomaly detection because the discriminator D is trained to distinguish between the "normal" (real) data samples and the "anomalous" (fake) samples created by the generator. An encoder E can be trained simultaneously that maps observed images to the latent space $E(X) \rightarrow Z$. The encoder and generator can generate what an image is expected to look like given the distribution learned by the generator and encoder during training. The software can measure an anomaly by combining a comparison between the data with the image produced by application of the encoder and the generator ($f_1$ in Equation 1) and a confidence of the discriminator that the data is normal ($f_2$ in Equation 1):

$$A = f_1(G(E(X),X) + f_2(D(X)) \quad \quad \text{Equation 1}$$

The software 230 can directly characterize the latent space to leverage both the generator and discriminator without training an encoder, and/or the C-BiGAN anomaly detection framework can leverage and fuse the variety of available modalities to detect trojans.

According to one or more embodiments, the software 230 can use the tiles of one or more modalities (e.g., optical and/or laser profilometer) as an input for a C-BiGAN, which attempts to create realistic data in another modality (e.g. IR). The software 230 can also use a C-GAN to predict a non-anomalous modality, which may be compared to an observed modality using a loss function. The software 230 can assume that the majority of boards (e.g., above a threshold percentage) and/or most of any given board (e.g., above a threshold percentage) does not contain a trojan, and that therefore ML/AI algorithms trained to relate different modalities will be mostly uncontaminated by the effect of trojans in training data obtained from COTS PCBs. The software 230 can use the encoder of the C-BiGAN to input all the tiles associated with MMS to the C-BiGAN. The set of tiles with a high anomaly score may be used to generate an anomaly heat map of the object of interest, such as the PCB. The software 230 can perform this procedure in a round robin fashion for each modality generating multiple heatmaps which can be averaged or summed.

According to one or more embodiments, the software 230 can identify cloaked trojans based on the effect of different modalities on imaging types that reflect activity, such as IR, EMI, and THZ (e.g., EMI signals that do not match those predicted by the visual image could indicate a cloaked hardware trojan). For example, a C-BiGAN may be trained to map IR images of a "powered-off" PCB to one that is "powered-up", conditioned on the powered-off images. The powered-off IR image of a suspect PCB may be input to generate an image of the expected IR-on image. The generated and empirically observed images may be compared for anomalies. According to one or more embodiments, a similar approach is taken for localized time series EMI signatures. The software 230 can utilize specialized bi-GAN architectures such as MAD-GAN to generate appropriate encoders, generators, and discriminators for time series data. The software 230 can map the measured EMI time signals to an image, e.g., using Gramian Angular Field technique to produce a "GAF image" (e.g., a PCB which is overlaid with a heatmap indicating EMI signal strength at a specific wavelength). The GAF image may be used to relate structural imaging to EMI through C-BiGAN generators and encoders. According to one or more embodiments, in addition to, or alternative to comparing observations of powered-off devices with powered-up devices, other behavioral states are evaluated, such as device stimulation. By manipulating the code being executed, differences in EMI signatures during normal operation and secure operations, such as Advanced Encryption Standard (AES) operations can be observed.

According to one or more embodiments, the software 230 can use C-BiGANs to advantageously fuse different modalities of data and make use of limited sets of examples (e.g., as typically available in hardware manufacture). The software 230 can detect anomalous objects in or on the device and/or detect discrepancies between sensor modalities by using C-BiGANs that are trained by the overall structure of a device.

Figure 3:
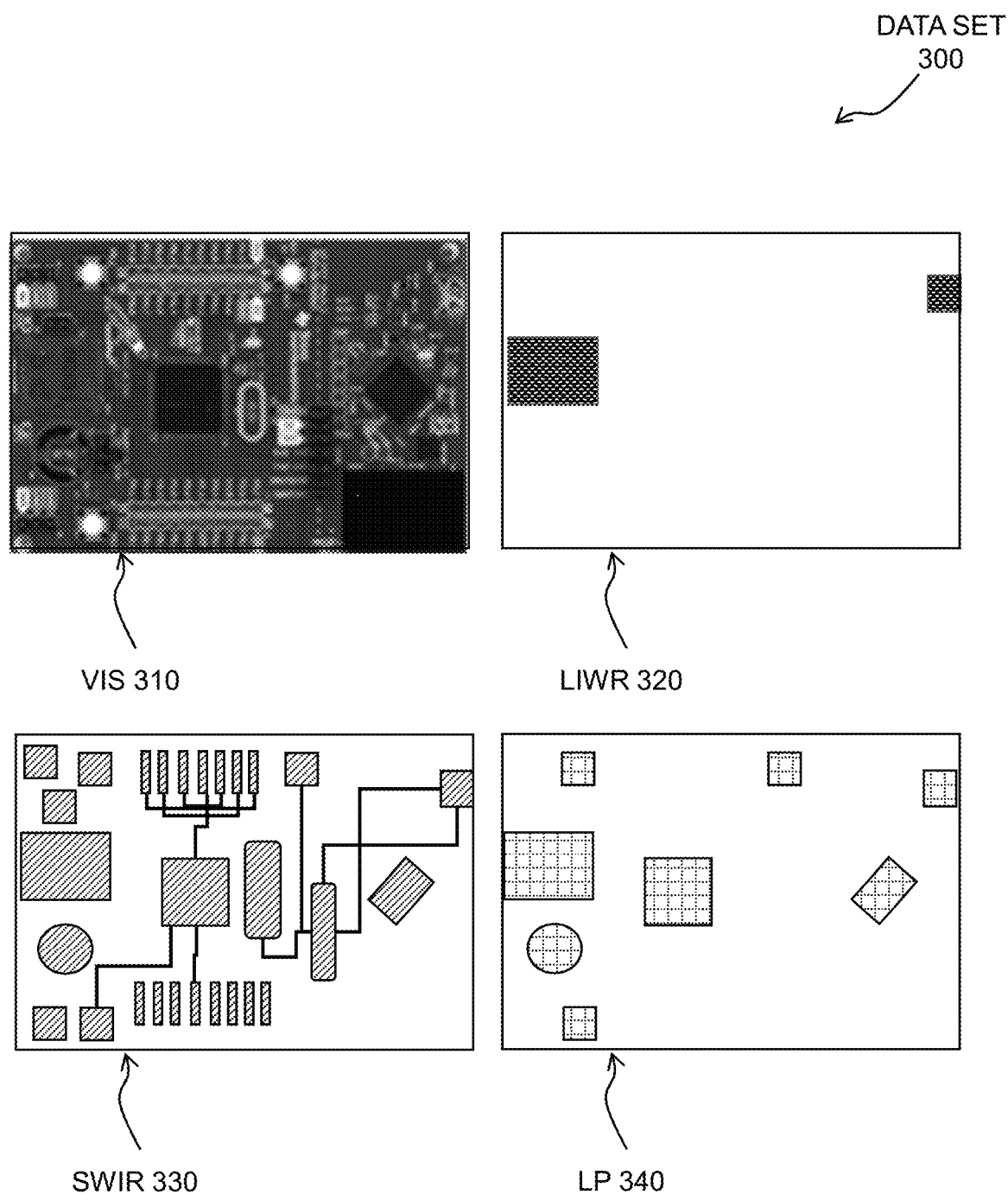
FIG. 3 illustrates an example data set of different modalities of object of interest according to one or more embodiments.

FIG. 3 illustrates an example data set 300 of different modalities of an object of interest (e.g., a MMS dataset for the sample 150 of FIG. 1), according to one or more embodiments. This example data set 300 can generally be presented as a color map (e.g., colormaps emphasize the strength of each modality), but for ease of explanation is presented herein as block figures in black and white. The modalities captured include a visual (VIS) scan 310 (e.g., an RGB image), a longwave infrared (LWIR) scan 320, a shortwave infrared (SWIR) 330, and a laser profilometry (LP) 340 with a uniform perspective across the scans. Note that the example data set 300 can be an example where a success of a risk detector of the software 230 benefits from the full MMS. In this example, not only does the MMS input assist in correctly identifying a high risk region, but it also correctly identifies regions with no risk features, whereas the VIS-only input incorrectly identified that same region as being high risk.

The VIS scan 310 can provide information in a visible light spectrum, the LWIR scan 320 can provide location and diversity of materials information including exposed metals, the SWIR scan 330 can provide a location of covered traces regardless of contrast in a visible light spectrum, and the LP can 340 can provide a height of all components present on an object or interest. According of one or more embodiments, the data set 300 is generated for an object of interest (e.g., a multimodal data capture for COTS devices) to include metadata captured in a characteristic hierarchy indicating product type, manufacturer, model, series number, and/or one or more unique sample identifiers. If the data set 300 identifies one or more differences, modifications, or the like, these can be marked and stored as a (spatially-correlated) binary bitmap where true values indicate a location of modifications. Note that any design files available for the object of interest can also be included in the data set 300. Further, any additional modalities can be added to the data set 300, such as by fixing a new sensor to the MIS 100 of FIG. 1 or by changing data acquisition parameters (e.g., such as illumination and sample temperature). For example, using a LWIR sensor and powering the board, a steady state thermal emission can be captured and stored as a functional emissive LWIR modality that provides distinctly different information than passive LWIR data.

In an example operation to create the data set 300 and to determine a throughput of the MIS 100 of FIG. 1, MMSs were generated for five boards of various sizes while scan time per modality was recorded inside the computing device 160 (e.g., by the software 230), including both a time used as the translation stage/table 130 traveled through the collection pattern and a processing time used to compute a final stitched image. The MIS 100 generated MMSs at a rate of 5 s/cm2 of sample space, with 15.24%, 48.87%, 12.24%, and 23.64% of that time spent in the VIS, LWIR, SWIR, and LP data acquisition subroutines respectively. The time required to complete a LWIR subroutine, which According to one or more embodiments, may have the largest effect on throughput, may be reduced by changing to a sensor (e.g., the one or more inspection elements 120) with a larger field of view.

Figure 4:
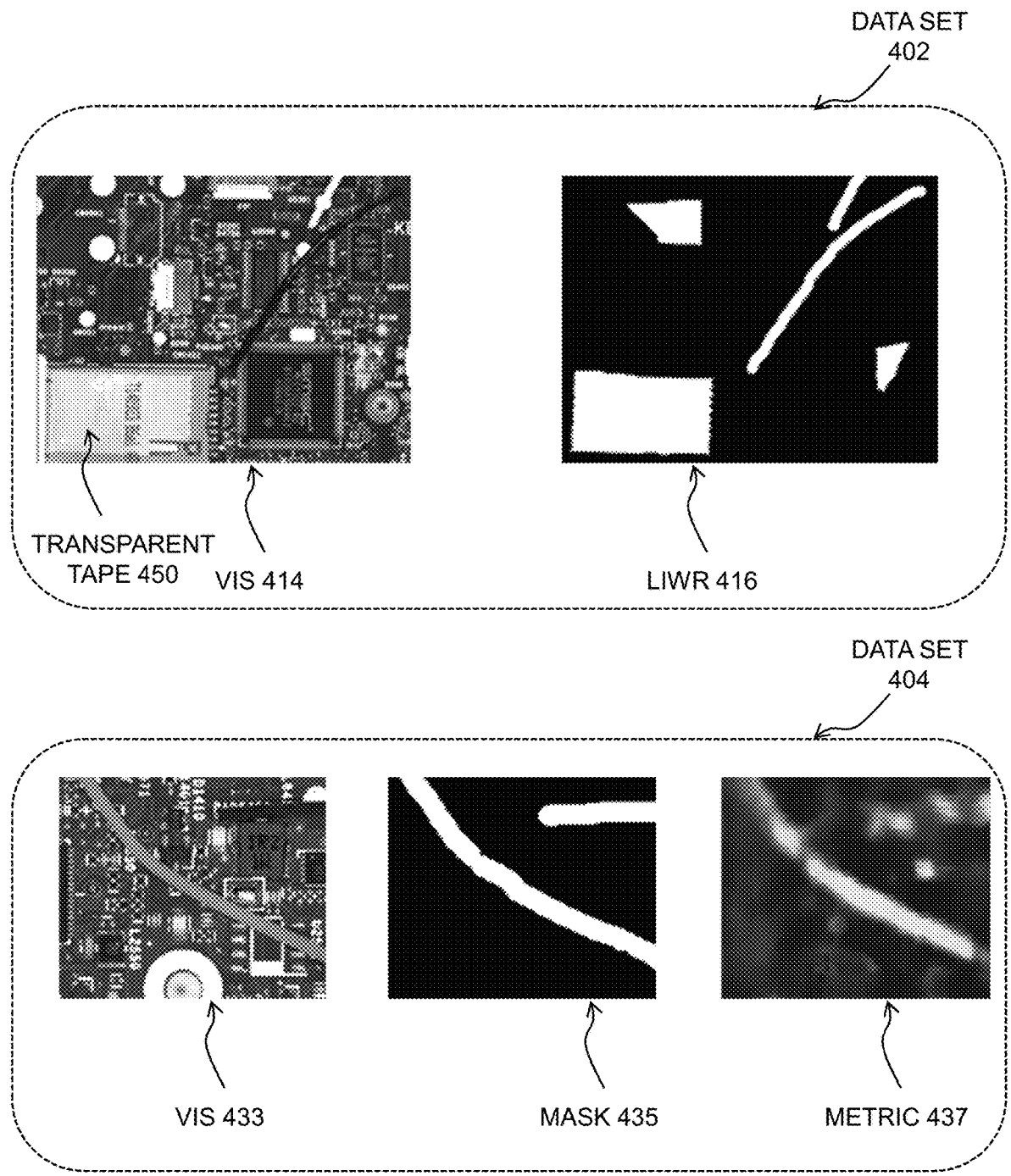
FIG. 4 illustrates two image series generated by a MIS according to one or more embodiments.

Turning to FIG. 4, two image series (e.g., data sets 402 and 404) generated by the MIS 100 of FIG. 1 according to one or more embodiments. The data set 402 shows example device images (e.g., a COTS PCB in this example) illustrating example high risk features. An image 414 illustrates the COTS PCB with risk features under visible light, and am image 416 illustrates a corresponding binary mask that indicates a location of each risk feature (e.g., to assist supervised feature detection methods of the MIS 100). The data set 402 shows 4 example device images (e.g., a COTS PCB in this example) including a VIS image 433 of the COTS PCB with added risk features, a corresponding binary mask 435, and visualization of spatially-correlated risk metric 437 generated using a full MMS as input. Note generally, in risk assessments, a risk datasets can be generated for a training data set, as shown by the transparent tape 450 of the data set 402. For instance, high risk features may be introduced to a variety of objects (e.g., PCBs) and full MMSs can be generated for each. Further, anomalies may include features known or suspected to be correlated with hardware tampering, such as wire segments (e.g., small wire segments) added to imitate jumper wires, and/or small pieces of transparent tape 450 to imitate resurfacing. Other features specifically or preferentially responsive to other modalities may also be added According to one or more embodiments.

According to one or more embodiments, different risk features are expected to have different signal strengths in different modalities. Accordingly, models including multiple scanning modalities to predict the spatially correlated metric may have the advantage of performing better than models including only a single (or fewer) scanning modalities. For example, visual imaging may be expected to show jumper wires more clearly, but to struggle with clear tape, while long wave infra-red may be expected to detect the material change introduced by the clear tape, but lack the resolution to resolve jumper wires. According to one or more embodiments, adding imaging modalities may reduce the noise contribution of certain components.

In view of FIGS. 1-4, operational examples of the MIS 100 and/or the software 230 are discussed herein with respect to FIGS. 5-13, the methods thereof are described with respect to FIGS. 1-4 as needed.

Figure 5:
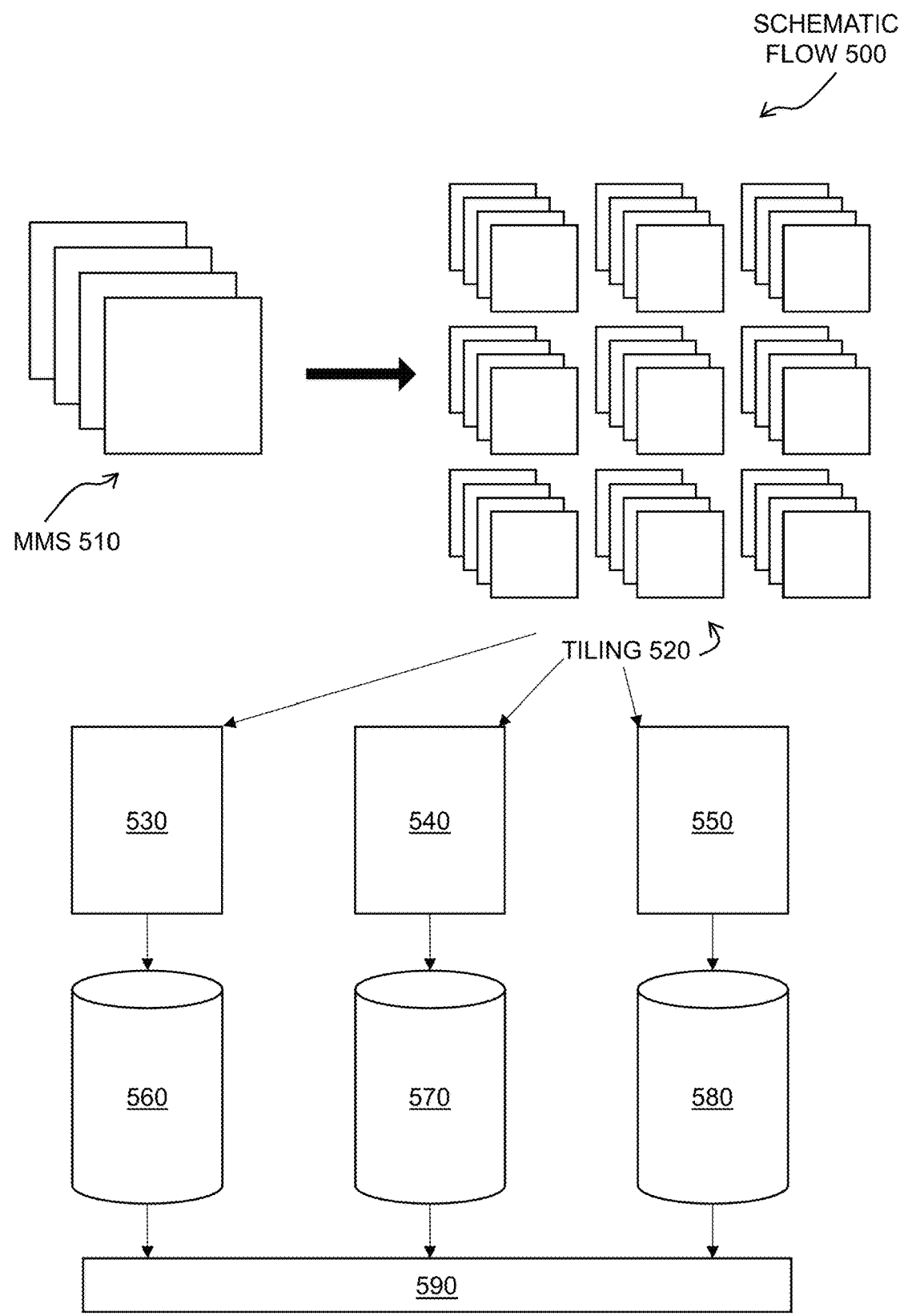
FIG. 5 illustrates a schematic flow for implementing various examples of a MIS according to one or more embodiments.

FIG. 5 illustrates a schematic flow 500 for implementing various examples of the MIS 100 and/or the software 230 according to one or more embodiments. The schematic flow 500, generally, is an example overview that begins with the generation of the MIS 510 by the MIS 100 of FIG. 1. Next, the computing device 160 tiles 520 the MIS 510. Each of the tiles 520 are passed to data extraction 530, supervised risk scoring 540, and unsupervised anomaly scoring 550 operations with the computing device 160. Respectively, the computing device 160 reassembles tiles 560, 570, and 580 from the data extraction 530, supervised risk scoring 540, and unsupervised anomaly scoring 550 operations that are providing one or more CNNs 590 (e.g., which work best from the center overlapped tiles). The one or more CNNs 590 produce/generate an anomaly heatmap.

Figure 6:
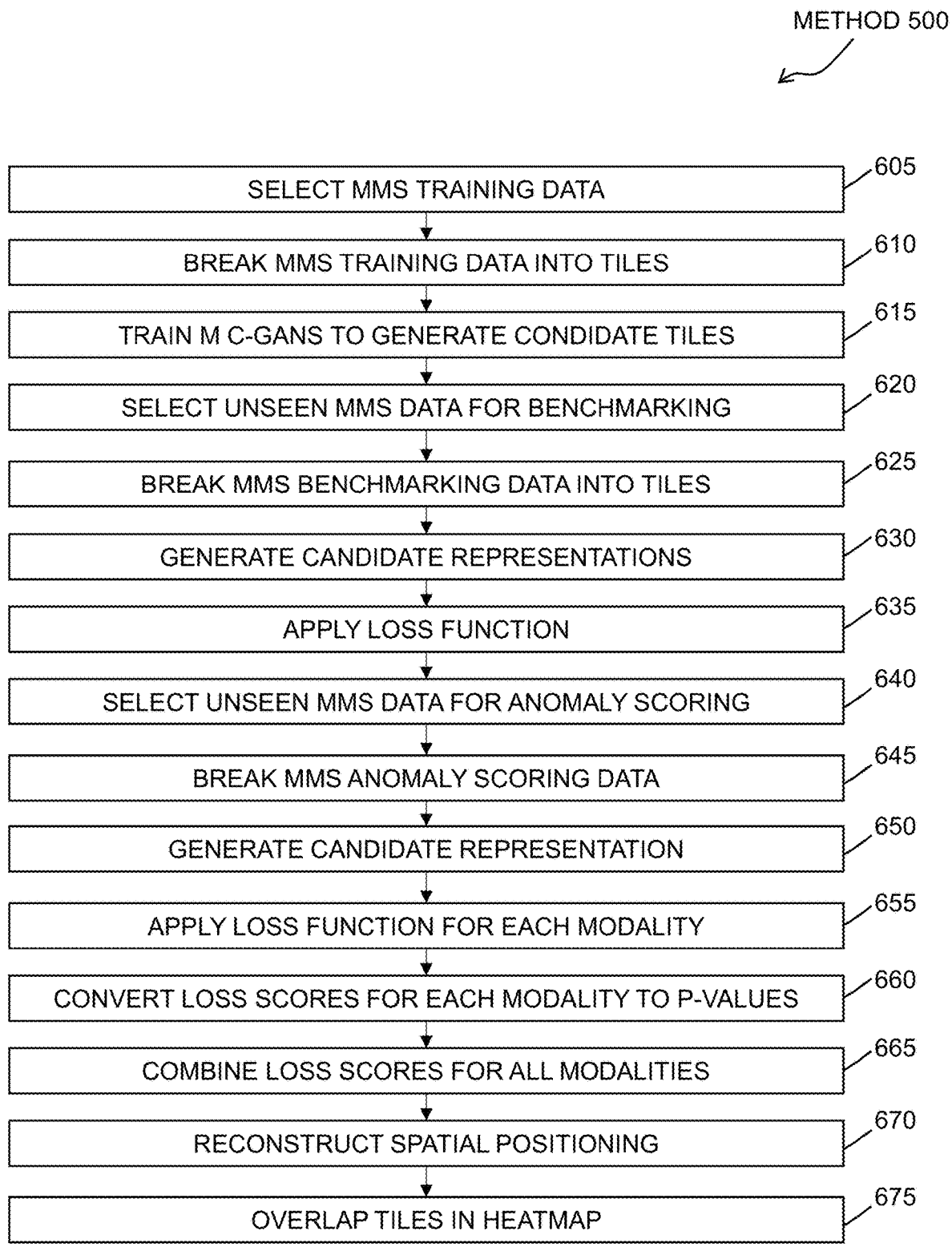
FIG. 6 illustrates a flow chart for an example method according to one or more embodiments.

FIG. 6 illustrates a flow chart for an example method 600 according to one or more embodiments. The method 600, generally, is an example process for detecting hardware variants using a GAN (e.g., C-GAN in this example).

The method 600 begins at block 605, wherein a plurality of MMS data having m modalities is selected as training data by the software 230. At block 610, the software 230 breaks the training MMS data into tiles of a fixed physical size (e.g., 1"×1"). At block 615, the software 230 trains m C-GANs to generate candidate tiles for each of m modalities using all other modalities as conditioning information. At block 620, the software 230 selects an unseen (e.g., non-training data) set of MMS for benchmarking.

At block 625, the software 230 breaks benchmarking MMS data into tiles of the fixed physical size (e.g., 1"×1"). At block 630, the software 230 generates each of the m C-GANs a candidate representation for each modality of each tile, such that each of the set of original MMS tiles is paired with one of a set of generated candidate MMS tiles. At block 635, the software 230 applies a loss function for each modality. For instance, the software 230 applies a loss function (e.g., MSE, or a loss function tailored to modality features) to pairs of observed and predicted data to generate a similarity metric to evaluate the expected loss distribution for each modality of each tile.

At block 640, the software 230 selects a further unseen set of MMS for anomaly scoring. At block 645, the software 230 breaks the anomaly scoring MMS into tiles of the fixed physical size (e.g., 1"×1"). At block 650, the software 230 generates candidate representations for each modality. For instance, each of the m C-GANs of the software 230 generates a candidate representation for each modality of each tile, such that each of the set of candidate MMS tiles is paired with one of a set of anomalies scoring tiles. At block 655, the software 230 applies a loss function for each modality. For example, a loss function (e.g., MSE or a loss function tailored to modality features) is applied to each pair of observed and predicted observations to generate similarity metrics.

At block 660, the software 230 converts loss scores from each modality to p-values. For example, the similarity metrics from each modality of each tile may be converted to empirical p-values using the modality loss distributions evaluated in block 635. The empirical p-value is the empirical probability of observing a metric greater than or equal to the metric associated with the tile under test. It is noted that any scoring strategy may be used, or the raw similarity metrics may be used, in the following steps.

At block 665, the software 230 combines low scores from each modality to p-values. In an embodiment, the empirical p-values of all modalities may be combined for each tile to generate a tile score for each tile. At block 670, the software 230 reconstructs the original spatial positioning of each tile to generate an anomaly heatmap. At block 675, the software 230 overlaps tiles in the heatmap to increase anomaly resolution beyond the underlying tile size.

Figure 7:
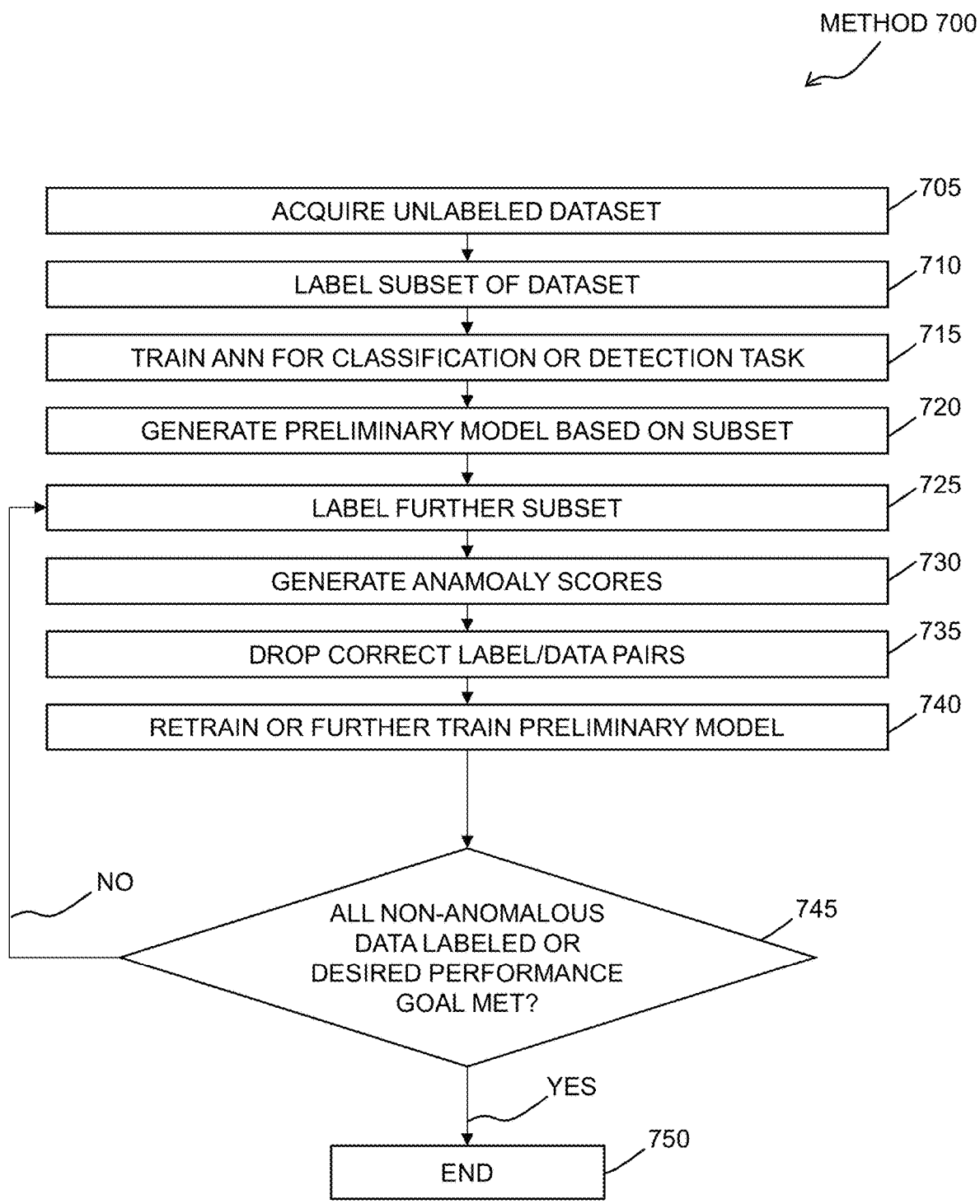
FIG. 7 illustrates a flow chart for an example method according to one or more embodiments.

FIG. 7 illustrates a flow chart for an example method 700 according to one or more embodiments. The method 700, generally, is an example process for self-supervised learning. At block 705, the software 230 acquires an unlabeled dataset for a classification or detection task. At block 710, the software 230 labels a subset of the unlabeled dataset. For instance, a first subset of the unlabeled dataset may be labeled (e.g., manually) for the classification or detection task. At block 715, the software 230 trains an ANN therein for the classification or detection task. At block 720, the software generates a preliminary model based on the subset using the anomaly detection. In an example, an anomaly detection algorithm (e.g., an ANN, BiGAN, C-BiGAN, variational autoencoder (VAE), and/or one-class support vector machine (SVM), etc.) is trained based on the subset to generate an anomaly detection model (e.g., another ANN, or other model). At block 725, the software 230 predicts labels for a further set of the unlabeled data using the preliminary model.

At block 730, the software 230 generates anomaly scores for each of the further subsets. In this regard, the new combinations of data and labels are run through the anomaly detection model of the software 230 to generate anomaly scores for each of the new data/label pairs generated using the preliminary model. At block 730, the software 230 drops label/data pairs having a high (e.g., above a threshold) anomaly score. These label/data pairs can be further analyzed or referred to a human for manual label correction. At block 740, the preliminary model can be re-trained or further trained, by the software 203, based on the original hand labeled data and data labeled (of block 725). According to one or more embodiment, re-training is preferred to further training to avoid overtraining on the original hand labeled data.

At decision block 745, the software determines whether all non-anomalous data is labeled or whether a desired performance goal is met. If yes to either, the method 700 proceeds to block 750 and ends. Otherwise, the method 700 returns to block 730 and repeats until all non-anomalous data in the original corpus is labeled, or until desired performance goals (e.g., accuracy, F1 score, categorical loss entropy, and/or any other goal) are met.

According to one or more embodiments of unsupervised anomaly detection for self-supervised learning by the software 230, large corpuses of unlabeled potential training data can be used to improve model robustness. Accordingly, some implementations of the software 230 include labeling a relatively small proportion (e.g., above, at, or below a desired threshold percentage) of the available training data, and training a preliminary model based on that labeled subset. The trained preliminary model may be used to classify another subset of the unlabeled data. An unsupervised anomaly detection algorithm trained on the classes in the original labeled data may be used to score the new classifications. Classifications that are identified as not anomalous (e.g., having an anomaly score below a threshold) may be added to the training set, while classifications identified as anomalous or potentially anomalous (e.g., having an anomaly score above a threshold) may be either introduced as negative examples, or identified for human reclassification, which has the advantage of improving model robustness and/or reducing the burden associated with human labeling. Further, advantageously stack a supervised learning algorithm and an unsupervised anomaly detection algorithm to direct human labeling efforts to the highest value data.

According to one or more embodiment, the software 230 provides ML/AI assisted recovery of design data for devices. For example, the software 230 provides ML/AI assisted PCB schematic recovery, where multimodal scanning data is input to an ANN or other prediction model to predict design information (e.g., the design files used during manufacturing) for the scanned device (e.g., PCB). This may facilitate the application of tools comparing the observed design to the intended design, or re-ingestion into design tools for validation Note that recreation of device schematics (e.g., for PCBs) require a significant expenditure of time by expert reverse engineers, and this process can only be applied to a small subset of purchased devices. Accordingly, the software 230 provides multimodal scans to reduce the time and cost associated with this process, and/or to allow for inspection of many more components. For example, According to one or more embodiments, every purchased PCB may have a multimodal signature and recovered design associated with it. This approach may be fed into other design comparison and verification tools (e.g., EasyEDA, Altium, Designer, Eagle, etc.). The software 230 can use design reconstruction tasks to quantify information gained from adding modalities.

The software 230 can also implement characterization and anomaly assessment techniques, such as when MMS data from the MIS 100 of FIG. 1 characterizes the functionality of the MMS data (e.g., generates a characteristic and/or schematic). According to one or more embodiments, schematics or other information relating to a device (e.g., PCB or surface-mounted component (SMC)) are "looked up" based on the characterization. Further, the software 230 can relate to information characterization. For example, a descriptive power added by each additional scanning modality is characterized (e.g., because the purpose of the MIS 100 of FIG. 1 is to accurately characterize the physical structure under observation). In this regard, a design prediction task may be implemented to assess the information contained in each spatially correlated signature. Design prediction models may be trained and scored for each combination of scanning modalities. The task may be benchmarked on models using noise and design information as inputs in order to establish empirical upper and lower bounds for performance (e.g., in terms of binary cross entropy for material layers, accuracy of connectivity estimates, mean area precision for surface mounted component (SMC) detection, etc.). To generate design targets, design information (e.g., design files, such as EagleCAD design files, defining the canonical physical structure of the physical structure under observation, such as PCBs, COTS devices, etc.) may be converted into sets of raster images where each image represents a potential design layer and each pixel value represents the presence or absence of that layer at a particular spatial position. These sets of images may be processed (e.g., hand-processed or algorithmically aligned) to be spatially-correlated with the multimodal signatures. A convolutional encoder-decoder architecture (e.g., CNN) may be implemented for design prediction. Convolutional architectures are successful in many image tasks and may be particularly useful in the instant example because they allow a complex function to be slid across each pixel of the multimodal signatures to predict each layer of the design file. An encoding/decoding structure may be selected with max pooling between encoding layers and up sampling layers between decoding layers, e.g., to limit the number of parameters to be trained. A loss function may be used, such as a loss function that includes a function for scoring the quality of the model output against a target output (e.g., mean squared error (MSE), binary cross entropy (BCE) soft dice, or a combination of these and/or any other metrics). For example, BCE may be chosen as a loss function, e.g., because each design layer is either present or absent at each spatial location. An optimizer may be used, such as an optimizer that includes a system, device, and/or method for iteratively updating parameter values (e.g., such as ANN weights, to improve model performance on the loss function). For example, the "Adam" optimizer may be used, e.g., because of its robust performance and empirically short training times.

According to one or more embodiments, each set of modalities may be generated by a single neural architecture (e.g., with the number of input layers modified for different modalities). To simplify model training and evaluation each model may be trained for a number of epochs (e.g., 200) on a training set of MMS (e.g., scanned PCBs) with the BCE loss on a test set of MMS evaluated at the end of each epoch. Each model's lowest average loss over a ten-epoch window may be reported after the BCE loss is evaluated. This approach may result in over-trained models, but According to one or more embodiments, by capturing the best test losses the analysis may be performed as if the models were appropriately trained. Some implementation techniques can be applied to reduce the noise associated with random model fluctuations, e.g., by averaging over a number (e.g., 10) of epoch windows. According to one or more embodiments, loss functions may be transformed to information scores, e.g., for ease of discussion. For example, a model trained on noise may be characterized as having an information score of zero, while a model trained on the original design information may be characterized as having an information score of one hundred. Example information scores are compared in TABLE 2.

TABLE 2

| Single Modality | | Multiple Modalities | |
|---|---|---|---|
| Modality | Information Score | Modality | Information Score |
| VIS | 65.5 | VIS + LWIR + SWIR + LP | 75.3 |

TABLE 2-continued

| Single Modality | | Multiple Modalities | |
| --- | --- | --- | --- |
| Modality | Information Score | Modality | Information Score |
| LWIR | 23.7 | VIS + LP | 76.9 |
| SWIR | 53.0 | VIS + LWIR | 76.4 |
| LP | 15.1 | VIS + SWIR | 74.7 |

Overtraining may limit the generalizability of the trained models of the software 230 in some cases, e.g., due to a relatively small corpus of MMS with matching design files. This phenomenon may be demonstrated by models using multiple modalities. Because the inputs to such models include copies of the information used by simpler models, the training process of the software 230 learns to ignore the less useful modalities and perform no worse than the best model trained on any subset of the modalities. However, in practice such models of the software 230 may tend to achieve very good training losses and generalize poorly. According to one or more embodiments, the software 230 mitigates this through corpus expansion and utilization of transfer learning from unpaired MMS and design databases.

According to one or more embodiments, multimodal design prediction models of the software 230 provide improved results over single-modal or fewer-modal design prediction models. For example, a combination of visual imaging and laser profilometer data may yield better performance (e.g., 76.9) on an example information score metric than either individual modality (e.g. 65.5 and 15.1, respectively). Combining modalities may have the advantage of providing significantly more insight into an object (e.g., PCB) under examination.

Figure 8:
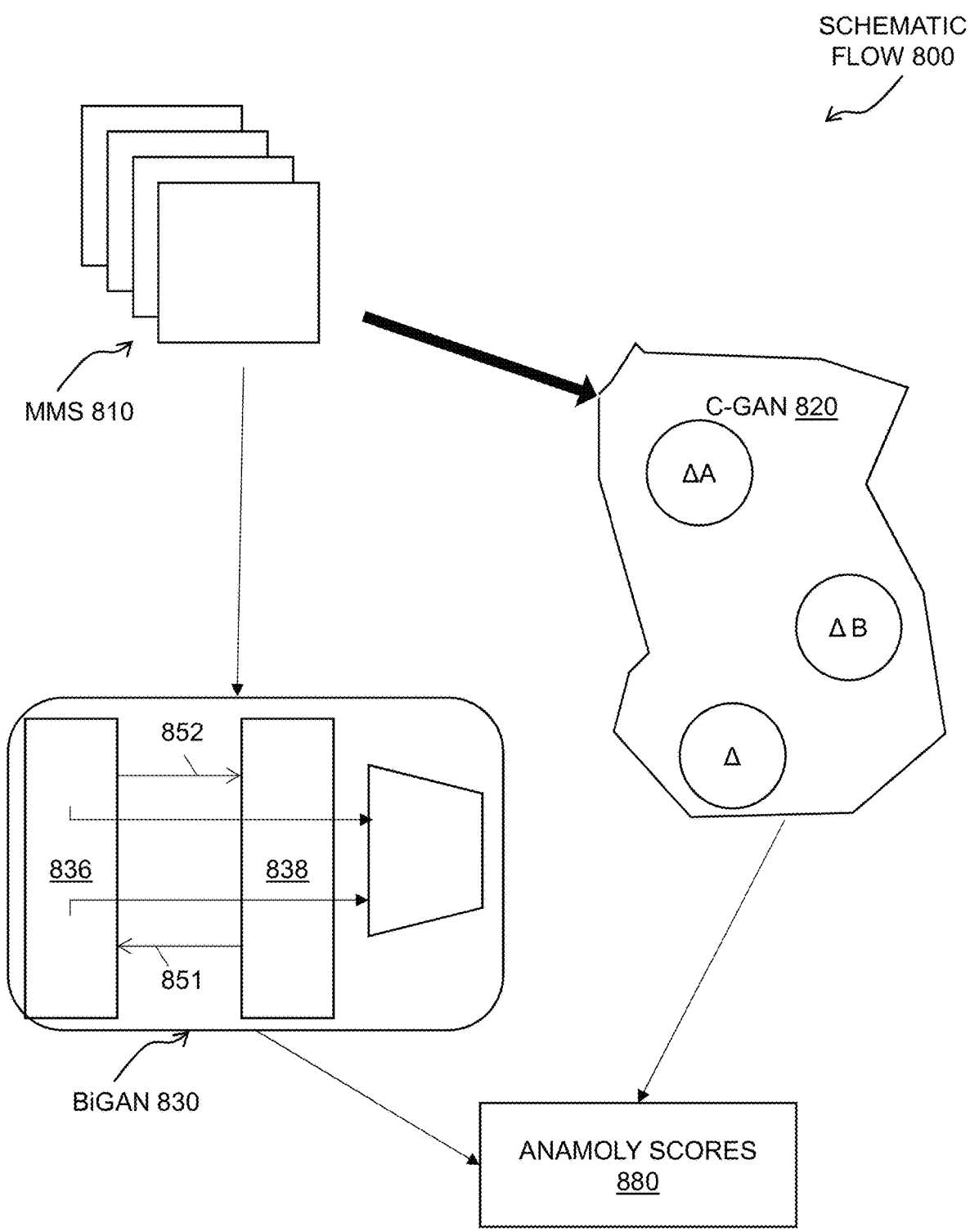
FIG. 8 illustrates a schematic flow for implementing various examples of a MIS according to one or more embodiments.

FIG. 8 illustrates a schematic flow 800 for implementing various examples of the MIS 100 and/or the software 230 to one or more embodiments. The schematic flow 800 includes an MMS 810 that can be provided to a C-GAN 820 and a BiGAN 830. The C-GAN 820 generate candidate tiles for each of m modalities using all other modalities as conditioning information. A result of the candidate tiles is represented by $\Delta A$, $\Delta B$, and $\Delta C$. The C-GAN 820 further can use a $f(\Delta A, \Delta B, \Delta C)$ to provide one or more anomaly scores 840. The BiGAN 830 can encode 851 and decode 852 between a data space 855 and a representation space 856 to reduce noise and detect a MMS deviation, such that BiGAN 830 fuses different modalities to provide one or more anomaly scores 840.

Figure 9:
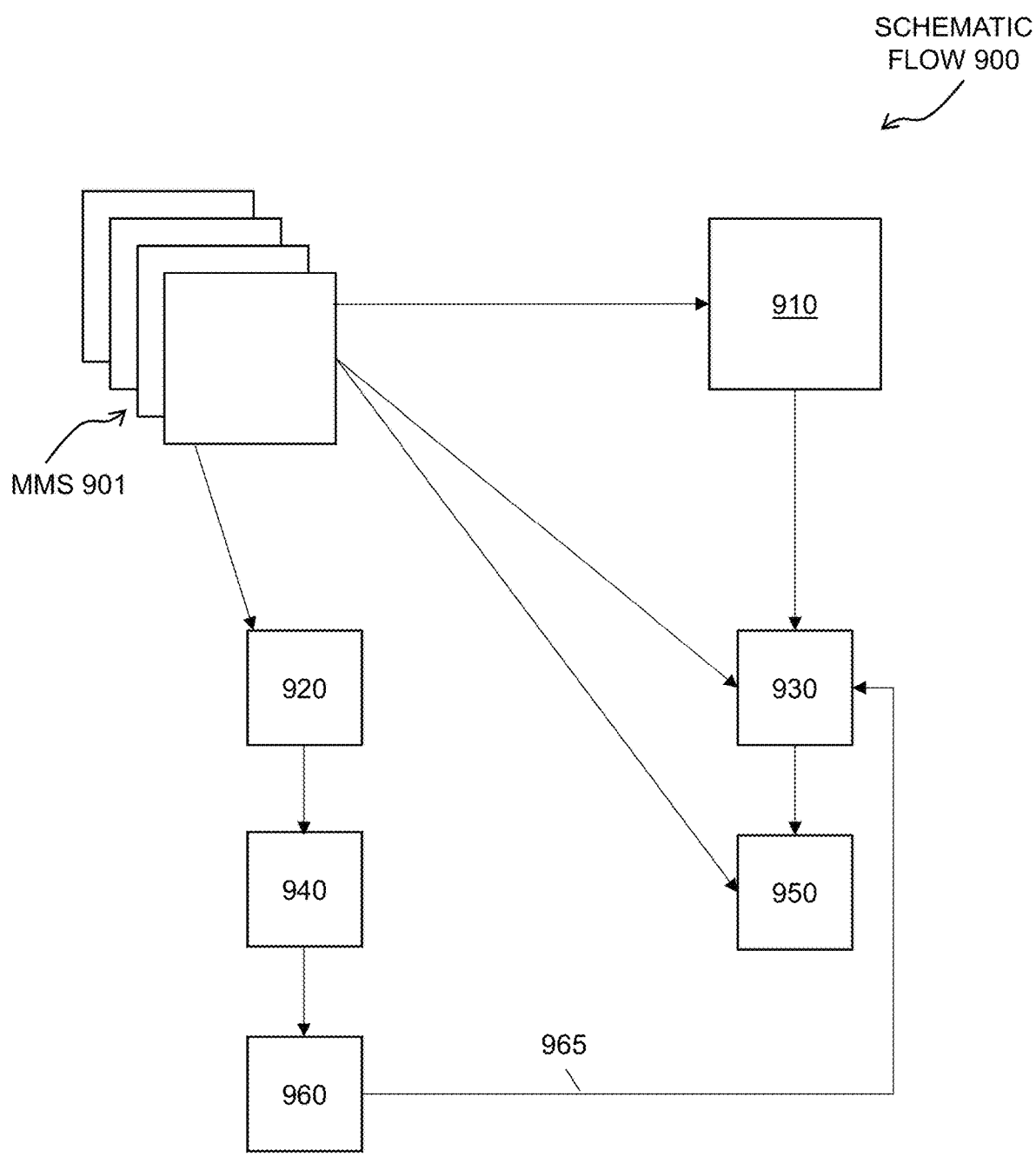
FIG. 9 illustrates a schematic flow for implementing various examples of a MIS according to one or more embodiments.

FIG. 9 illustrates a schematic flow 900 for implementing various examples of the MIS 100 and/or the software 230 to one or more embodiments, such as anomaly detection for self-supervision. As shown in the schematic flow 900, many MMS 901 are received. A small set 910 of labeled components are used to train detectors, while the MMS 901 can be used to predict unlabeled components. A score 940 is provided for the detected components, while the BiGan 850 is further trained for anomaly scoring. At block 960, the most anomalous detections are dropped to generate labels, so the software 230 finds the most anomalous detection (e.g., the likely errors) and improve generalizations (see arrow 965) by adding training data.

Figure 10:
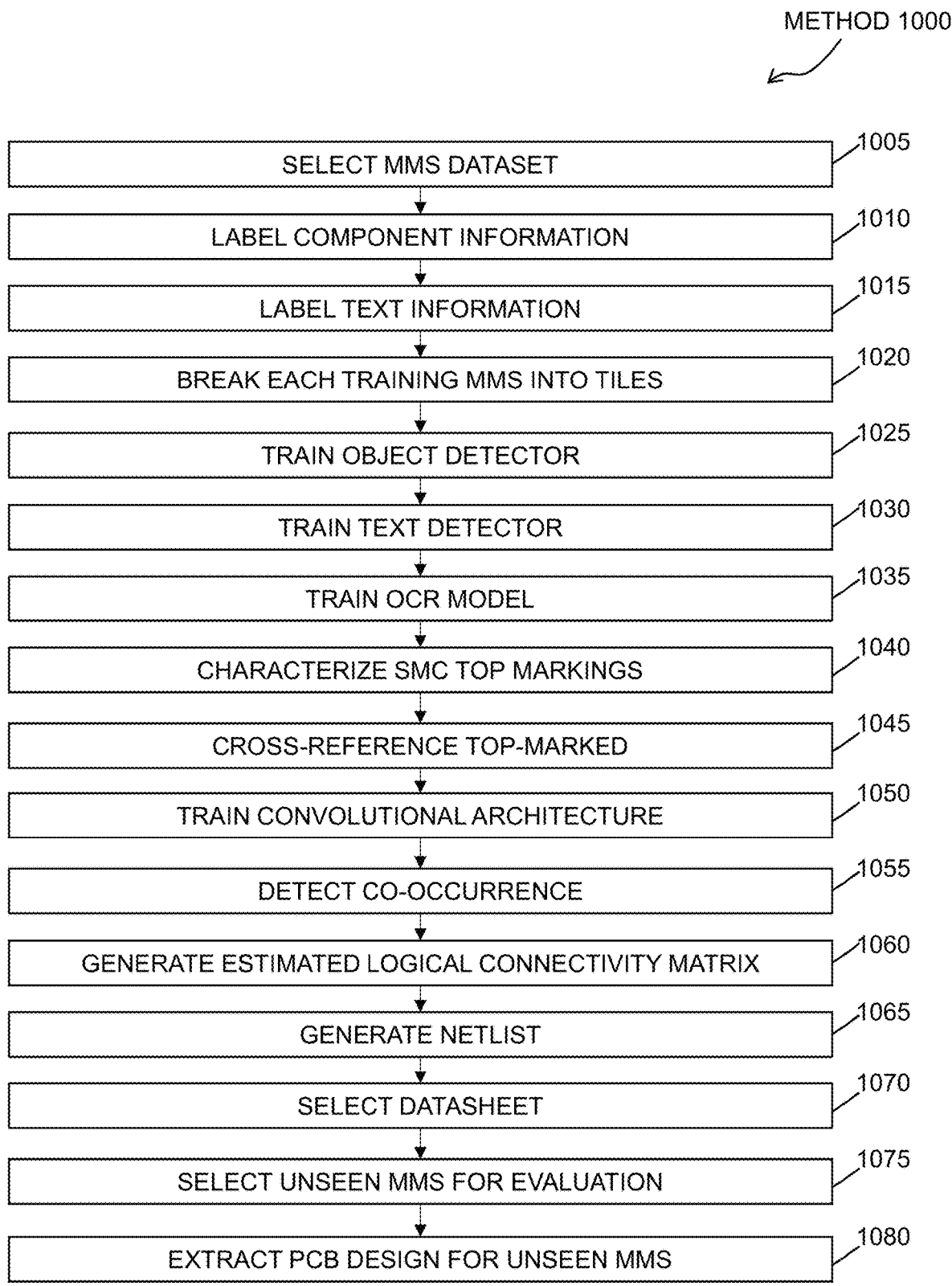
FIG. 10 illustrates a flow chart for an example method according to one or more embodiments.

FIG. 10 illustrates a flow chart for an example method 1000 according to one or more embodiments. The method 100, generally, is an example process for AI assisted recovery of design data for devices.

The method 1000 begins at block 1005, wherein a set of MMS of a PCB may be selected as training data. It is noted that a PCB is used as a convenient example; the process is applicable to any device. At block 1010, positions and types of surface mounted components (SMCs) or other components of the PCB may be hand labeled in the training data (e.g., on a visual image of the board, adding boxes around each SMC and labels describing a category corresponding to each SMC).

At block 1015, position, orientation, and other aspects of text on the PCB may be hand labeled in the training data (e.g., on a visual image of the board, adding text corresponding to each SMC). At block 10120 the training MMS are broken into tiles of a fixed physical size (e.g., 1"×1").

At block 1025, an object detector of the software 230, such as "you only look once" (YOLO) or a single shot detector (SSD) (or any other architecture for predicting sets of detections), may be trained to identify SMCs on the PCB based on models of the SMCs. According to one or more embodiments, non-visual sensor modalities may be included as additional input channels. At block 1030, a text detector of the software 230 (e.g., and ANN, such as the EAST detector) may be trained to identify text locations on the PCB.

At block 1035, an OCR model may be trained to generate a representation (e.g., American Standard Code for Information Interchange (ASCII) coded) of text at identified locations on the PCB. At block 1040, SMC top markings for a bill of materials are characterized based on overlapping text detections and SMC detections. At block 1045, top-marked SMCs and other text detections are cross-referenced in a database (e.g., an external datasheet database) to yield a set of associated datasheets (e.g., for review by an engineer or input for automatic review or further analysis).

At block 1050, a CNN (e.g., UNET or modified UNET) is trained to predict rasterized design layers based on tiles which include top-marked SMCs identified in block 1025. For each tile, the prediction may yield another tile which includes a score (e.g., a confidence score) describing a whether or not each design layer is present at each spatial location. Example design layers include top silkscreen, top copper, soldermask, bottom copper, drills, etc. At block 1055, locations (e.g., all locations) where copper and soldermask design layers co-occur may be identified, and co-occurrences near SMC detections may be indicated as probable pin locations. Such locations may be on a pixel-by-pixel level within each tile.

At block 1060, a logical connectivity graphs and/or logical connectivity matrix may be generated by iterating over possible thresholds for layer presence. Such graphs and/or matrices may include data structures for characterizing which pins are in contiguous contact with electrically conductive material. For example, if two pins are connected entirely via pixels with copper presence confidence values greater than a threshold of 0.99, the pins may be determined to be electrically connected (and accordingly, logically connected), whereas if two pins are connected via any pixels with values less than a threshold of 0.01, the pins may be determined not to be electrically connected (and accordingly, not logically connected).

At block 1065, the values of the estimated connectivity matrix may be binarized to yield a netlist which describes estimated groupings of pins to SMCs and estimated connections between pins. At block 1070, datasheet and detection information from block 1045 may be connected with estimated connectivity information from block 1065 to produce an extracted PCB design. At block 1075, an unseen MMS may be selected for evaluation. At block 1080, a PCB design is extracted based on the models and processes of the fourth through fourteenth steps.

According to one or more embodiments, the software 230 provides spatial risk scoring. For example, some implementations input multimodal scanning data to inspect PCBs and highlight regions that show indications of tampering. This may facilitate identification of these regions for further expert or automatic inspection. Accordingly, as typically inspection of devices (e.g., PCBs) for potentially malicious variations (e.g., hardware trojans) requires a significant expenditure of time by expert engineers, the software 230 accelerates this process by triaging suspicious regions using multimodal scans. This can have the effect of reducing the time and cost associated with identifying malicious variations, and/or may also facilitate inspection of a greater number of components. Such inspection scaling techniques may have the advantage of improving microelectronics supply chain defenses.

Figure 11:
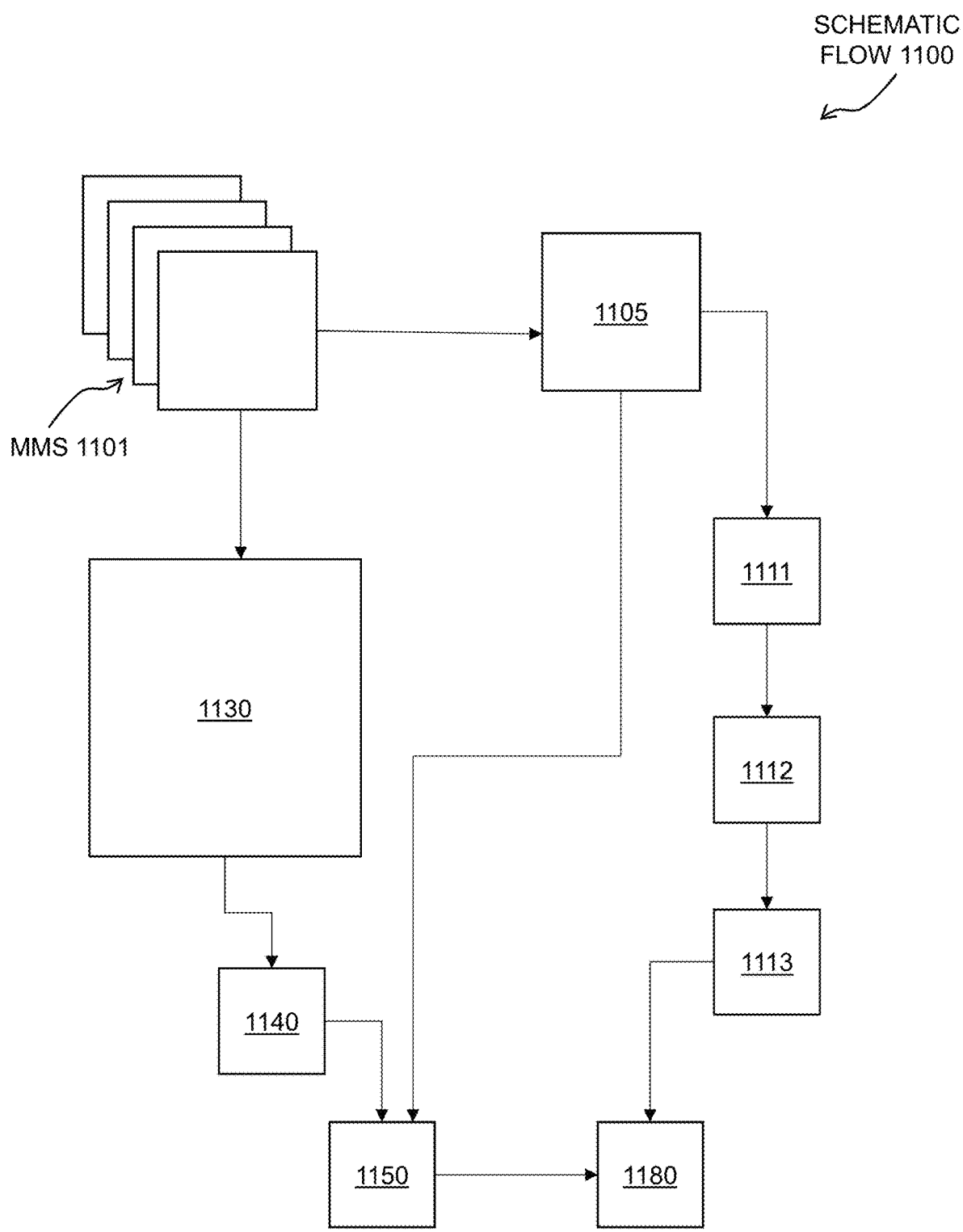
FIG. 11 illustrates a schematic flow for implementing various examples of a MIS according to one or more embodiments.

FIG. 11 illustrates a schematic flow 1100 for implementing various examples of the MIS 100 and/or the software 230 to one or more embodiments, such as for design extraction. The schematic flow 1100 includes an MMS 1101 that can be provided to a component detector 1105 of the software 230. The component detector 1105 uses a NN architecture with the MMS 1101 as input channels to output OCR results 1111, datasheet connections 1112, and a bill of materials 1113. Further, a modified NN architecture 1130 utilizes the outputs of the component detector 1105 and the MMS 1101 to predict design layers from a schematic. Next, the software 230 extracts 1140 a connectivity graph and generates a netlist 11140 (in combination with information form the component detector 1105, all of which can be combined to produce an extracted design 1180.

Figure 12:
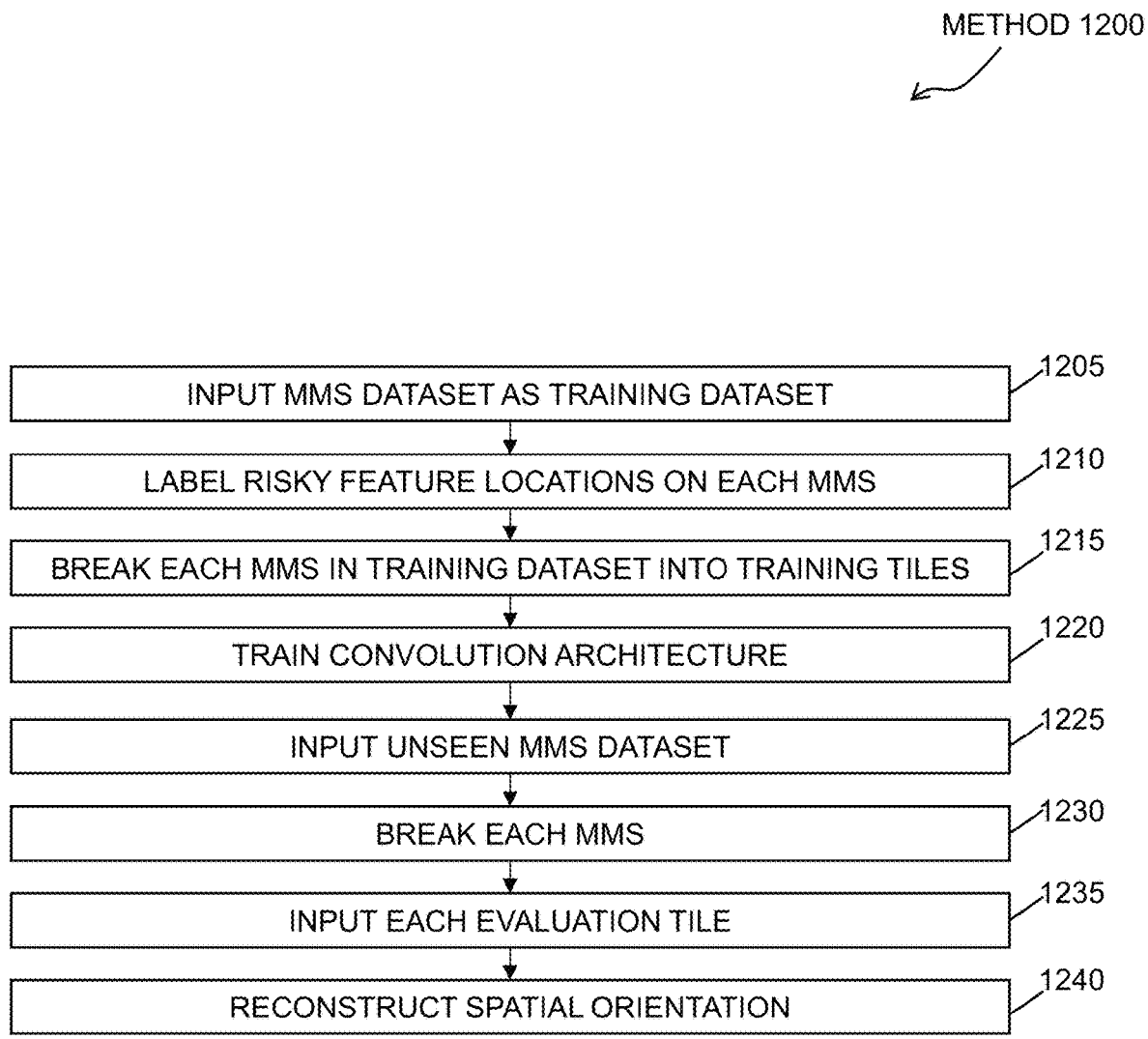
FIG. 12 illustrates a flow chart for an example method according to one or more embodiments.

FIG. 12 illustrates a flow chart for an example method 1200 according to one or more embodiments. The method 1200, generally, is an example process for spatial risk scoring. The method 1200 begins at block 1205, wherein a set of MMSs are selected to be used as training data.

At block 1210, locations of features considered to pose a risk are hand labeled on each MMS. For example, the region of the visual image corresponding to the MMS associated with the risky feature may be colored (e.g., color-coded) using image editing software. At block 1215, the training data MMSs may be broken into tiles of fixed physical size (e.g., 1"×1").

At block 1220, an ANN (e.g., CNN or other convolutional architecture) is trained to predict pixels associated with the risky feature based on the training data MMSs as input, and the paired risk map (e.g., colored visual image associated with each MMS) as output. At block 1225, an unseen MMS ("evaluation MMS") may be selected for evaluation by the trained convolutional architecture developed in block 1220.

At block 1230, the evaluation MMS may be broken into tiles ("evaluation tiles") of the fixed physical size (e.g., 1"×1"). At block 1235, each evaluation tile may be input to the trained convolutional architecture developed in block 1220 to generate a risk heatmap associated with each evaluation tile.

At block 1240, the original spatial positioning of the evaluation tiles may be reconstructed to generate a risk heatmap for the entire MMS. According to one or more embodiments, only the centers (or center quarters, i.e., the center of each of the four quadrants of the tile—a square with sides ½ the length of the tile and concentric with the tile) of the evaluation tiles are used to generate the MMS risk heatmap, e.g., to limit the impact of edge distortions introduced by convolutional approaches.

According to one or more embodiments, overtraining may cause significant generalizability problems. For example, an ANN trained such that it is heavily optimized to a certain training corpus may perform worse than a less optimized ANN if both are applied to unseen test data. According to one or more embodiments, the supervised training process may be limited to risk features inserted and scanned during the data collection process. According to one or more embodiments, one or both issues may be mitigated through additional data collection.

According to one or more embodiments, the software 230 provides unsupervised anomaly detection. Unsupervised anomaly detection strategies may be implemented to detect unforeseen anomaly categories. To assess our ability to recognize unknown anomalies, a model of the software 230 may be trained on MMS (e.g., using a scanning device such as discussed herein) and applied to a labeled anomaly corpus. According to one or more embodiments, such models may detect features that did not appear in their training corpus.

According to one or more embodiments, the unsupervised model is efficient GAN-based anomaly detection, e.g., based on defining and training a bidirectional GAN or BiGAN. Further, apart from having a generator and a discriminator as in a traditional GAN, the model includes an encoder that provides latent representations for data points. A learned feature vector that expresses the information required for an ANN to create a realistic MMS may be referred to as a latent representation. According to one or more embodiments, the discriminator evaluates not only input data (e.g., real or generated) but also latent representations of the data. After the architecture of the BiGAN has been defined, it may be trained on data assumed to be generally non-anomalous. After the model has been trained, it may be used to generate a score to measure how anomalous a test data point is during evaluation.

Such score may be referred to as an anomaly score. According to one or more embodiments, the anomaly score is a convex combination of the reconstruction loss (i.e., a comparison between the data with the image produced by application of the encoder and the generator) and a discriminator-based loss (i.e., a confidence of the discriminator that the data is non-anomalous). The reconstruction loss may be given by the A distance between a data point x and the generator evaluated at the latent representation of x (i.e., the encoder evaluated at x), where Amay be any legal distance function. The discriminator-based loss at a data point x may be given by the cross-entropy loss of the discriminator evaluated at the latent representation of x and when testing whether the point corresponds to a real example (this is a measure of the confidence in the ability of the discriminator to distinguish real data points from generated data points). The anomaly score takes the form of Equation 2:

$$\lambda\|x-G(E(x))\|_1+(1-\lambda)\psi(D(x,E(x)),1) \qquad \text{Equation 2}$$

In Equation 2, $\lambda$ is a weight between 0 and 1 fixed by the user, x is a test data point, G is the generator, E(x) is the encoder at the point x, D is the discriminator and $\psi$ is the cross entropy loss function. Note that w takes as input not only the discriminator but also the number 1, which is the label used to represent real data (as opposed to generated data) in this example.

The training set may include downsized overlapping tiles extracted from a set of representative images of objects (e.g., PCBs) that are not altered in any way. The architecture of the BiGAN may be based on any architecture for anomaly detection, e.g., adapted to the shape of the tiles.

Figure 13:
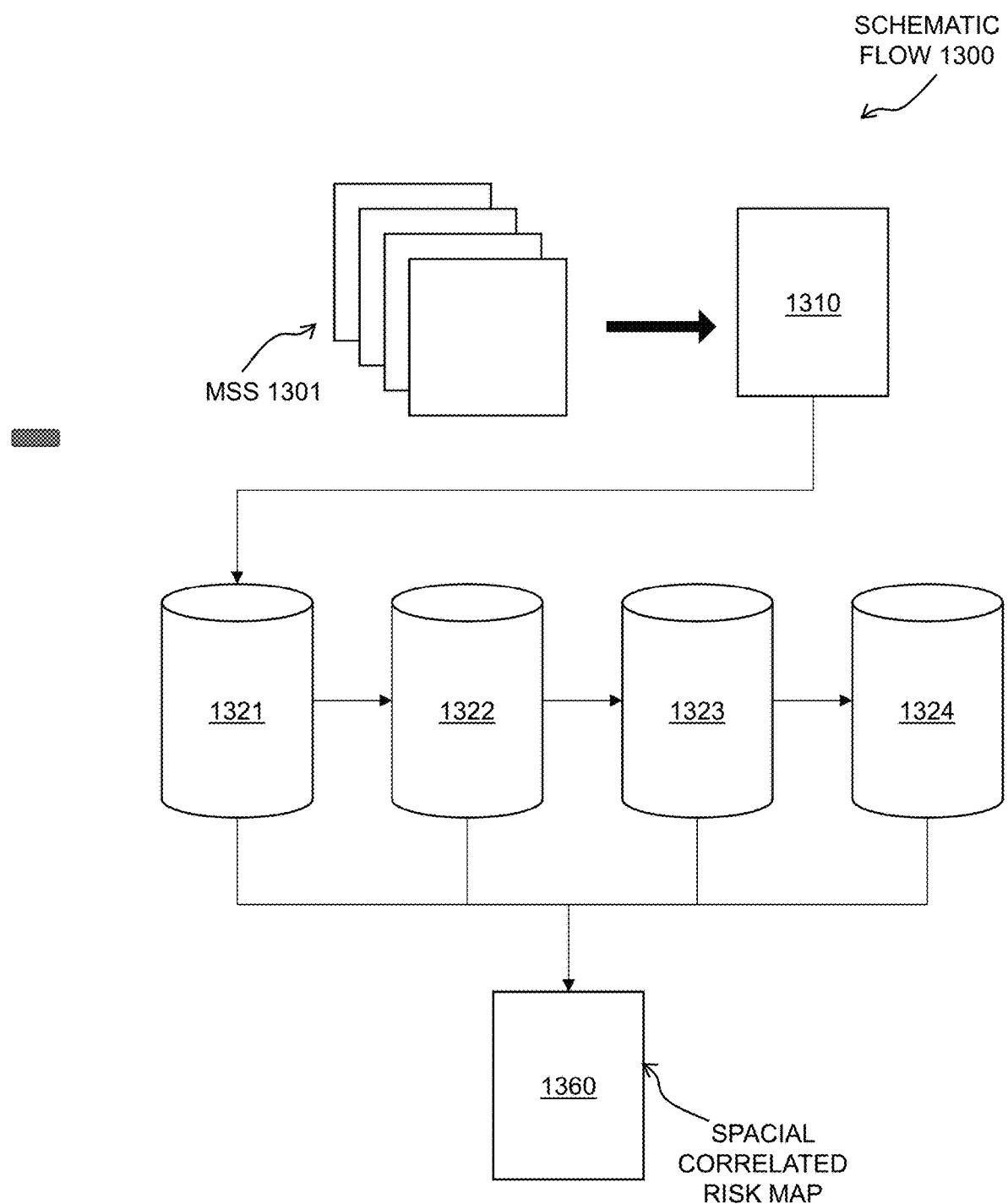
FIG. 13 illustrates a schematic flow for implementing various examples of a MIS according to one or more embodiments.

According to one or more embodiments, all tiles used as testing data may be matched with their corresponding anomaly mask, and a measure that represents the proportion of anomalous pixels in the original tile may be assigned to each mask image. According to one or more embodiments, all tiles having a mask score of at least a threshold amount (e.g., 10%) and/or or a mask score below a threshold amount (e.g., having a mask score of 0) may be binarized and used to obtain an F1-score. Here, the F1 score is a binary threshold to classify tiles as anomalous or non-anomalous. The F1 score may be a harmonic mean of the precision (i.e., of the proportion of anomaly detections that correspond to tiles with marked anomaly masks) and recall (i.e., the proportion of anomaly tiles that are detected). In some examples, the F1-score may achieve 76.4%. For example, FIG. 13 illustrates a schematic flow 1300 for implementing various examples of the MIS 100 and/or the software 230 to one or more embodiments, such as supervised special risk scoring. The schematic flow 1300 includes an MMS 1301 that can be used to generate masks 1310 highlighting regions of interest. A convolution model 1321, 1322, 1323, and 1324 analyzes the masks 1310 to provides a spatial correlated risk map.

Current PCB screening systems suffer from scalability problems, e.g., because they require individual oversight from highly skilled subject matter experts. Accordingly, some implementations provide automated systems that completely replace these engineers, or that triage potential abnormalities to increase inspection throughput. According to one or more embodiments, spatially correlated anomaly metrics may be determined, e.g., to better direct engineers to potential abnormalities for further inspection.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. For instance, for any of the methods and processes described herein, the steps recited may be performed out of sequence in any order and sub-steps not explicitly described or shown may be performed. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic. In addition, "coupled" or "operatively coupled" may mean that objects are linked but may have zero or more intermediate objects between the linked objects. Also, any combination of the disclosed features/elements may be used in one or more embodiments.

In addition, the methods and processes described herein may be implemented in a computer program, software, and/or firmware (e.g., a computer program product) incorporated in a computer-readable medium for execution by a computer or processor. That is, the computer program product may include a computer readable storage medium (or media) having computer readable program instructions thereon for causing a controller, processor, or the like to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick.

The computer readable program instructions described herein can be communicated and/or downloaded to respective controllers, processors, or the like from an apparatus, device, computer, or external storage via a connection, for example, network communications. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented by a software for a multimodal evaluation engine stored on a memory and executable by one or more processors coupled to the memory, the method comprising:
    receiving, by the multimodal evaluation engine, a plurality of multimodal signatures of an object of interest from one or more inspection elements, wherein the plurality of multimodal signatures comprise visible light, infrared, electromagnetic interference, and laser profilometry;
    processing, by the multimodal evaluation engine, the plurality of multimodal signatures to transform the plurality of multimodal signatures into one or more formats;
    generating, by the multimodal evaluation engine, data representations of the one or more formats; and
    detecting, by the multimodal evaluation engine, whether one or more anomalies are present within the object of interest based on the data representations.

2. The method of claim 1, wherein processing the plurality of multimodal signatures comprises executing a design information extraction operation.

3. The method of claim 1, wherein processing the plurality of multimodal signatures comprises executing a design information recovery operation.

4. The method of claim 1, wherein processing the plurality of multimodal signatures comprises executing a spatial risk scoring operation.

5. The method of claim 1, wherein the data representations include hyperspectral-multimodal scans of the object of interest, assessments of a bill of materials of the object of interest, determinations of how components are connected within the object of interest, or vulnerability information for the object of interest.

6. The method of claim 1, wherein processing the plurality of multimodal signatures comprises labeling a first subset of an unlabeled dataset of the plurality of multimodal signatures and training an artificial neural network on the labeled first subset.

7. The method of claim 1, wherein processing the plurality of multimodal signatures comprises:
    generating a plurality of labeled signatures from the plurality of multimodal signatures;
    grouping each of the plurality of labeled signatures into training tiles of a fixed physical size; and
    training an artificial neural network to identify components of the object of interest based on the training tiles.

8. The method of claim 1, wherein processing the plurality of multimodal signatures comprises:
    selecting training data having m modalities from the plurality of multimodal signatures;
    grouping the training data into training tiles of a fixed physical size; and
    training m conditional generative adversarial networks to generate candidate tiles for each of the m modalities.

9. A system comprising:
    a memory configured to store a software for a multimodal evaluation engine; and
    one or more processors coupled to the memory, the one or more processors configured to execute the software for the multimodal evaluation engine to cause the system to perform:
    receiving a plurality of multimodal signatures of an object of interest from one or more inspection elements, wherein the plurality of multimodal signatures comprise visible light, infrared, electromagnetic interference, and laser profilometry;
    processing the plurality of multimodal signatures to transform the plurality of multimodal signatures into one or more formats;
    generating data representations of the one or more formats; and
    detecting whether one or more anomalies are present within the object of interest based on the data representations.

10. The system of claim 9, wherein processing the plurality of multimodal signatures comprises executing a design information extraction operation.

11. The system of claim 9, wherein processing the plurality of multimodal signatures comprises executing a design information recovery operation.

12. The system of claim 9, wherein processing the plurality of multimodal signatures comprises executing a spatial risk scoring operation.

13. The system of claim 9, wherein the data representations include hyperspectral-multimodal scans of the object of interest, assessments of a bill of materials of the object of interest, determinations of how components are connected within the object of interest, or vulnerability information for the object of interest.

14. The system of claim 9, wherein processing the plurality of multimodal signatures comprises labeling a first subset of an unlabeled dataset of the plurality of multimodal signatures and training an artificial neural network on the labeled first subset.

15. The system of claim 9, wherein processing the plurality of multimodal signatures comprises:
    generating a plurality of labeled signatures from the plurality of multimodal signatures;
    breaking/grouping each of the plurality of labeled signatures into training tiles of a fixed physical size; and
    training an artificial neural network to identify components of the object of interest based on the training tiles.

16. The system of claim 9, wherein processing the plurality of multimodal signatures comprises:
    selecting training data having m modalities from the plurality of multimodal signatures;
    breaking/grouping the training data into training tiles of a fixed physical size; and
    training m conditional generative adversarial networks to generate candidate tiles for each of the m modalities.

17. A computer readable medium storing a software for a multimodal evaluation engine, the software being executable by one or more processors to cause the multimodal evaluation engine to perform:
    receiving a plurality of multimodal signatures of an object of interest from one or more inspection elements, wherein the plurality of multimodal signatures comprise visible light, infrared, electromagnetic interference, and laser profilometry;

processing the plurality of multimodal signatures to transform the plurality of multimodal signatures into one or more formats;

generating data representations of the one or more formats; and detecting whether one or more anomalies are present within the object of interest based on the data representations.

* * * * *